United States Patent
Nishizawa et al.

(10) Patent No.: US 7,681,213 B2
(45) Date of Patent: Mar. 16, 2010

(54) CONTENT DISTRIBUTION SYSTEM, CONTENT DISTRIBUTION CONTROL APPARATUS, CONTENT DISTRIBUTION CONTROL METHOD, CONTENT DISTRIBUTION CONTROL PROGRAM AND CONTENT DISTRIBUTION CONTROL PROGRAM STORAGE MEDIUM

(75) Inventors: Shigehiko Nishizawa, Kanagawa (JP); Katsushi Fujii, Chiba (JP)

(73) Assignee: Sony Corporation, Tokyo (JP)

( * ) Notice: Subject to any disclaimer, the term of this patent is extended or adjusted under 35 U.S.C. 154(b) by 1556 days.

(21) Appl. No.: 10/140,044

(22) Filed: May 8, 2002

(65) Prior Publication Data

US 2002/0184630 A1  Dec. 5, 2002

(30) Foreign Application Priority Data

May 16, 2001 (JP) ............................. 2001-147141
Jun. 6, 2001 (JP) ............................. 2001-171658

(51) Int. Cl.
*H04N 7/16* (2006.01)
*H04N 7/10* (2006.01)

(52) U.S. Cl. .................. 725/4; 725/8; 725/22; 725/32; 725/34; 725/36

(58) Field of Classification Search .................. 725/4, 725/8, 22, 32, 34, 36
See application file for complete search history.

(56) References Cited

U.S. PATENT DOCUMENTS

| | | | | |
|---|---|---|---|---|
| 5,410,343 A | * | 4/1995 | Coddington et al. | 725/99 |
| 5,963,916 A | * | 10/1999 | Kaplan | 705/26 |
| 6,324,182 B1 | * | 11/2001 | Burns et al. | 370/429 |
| 7,000,180 B2 | * | 2/2006 | Balthaser | 715/240 |
| 2001/0051996 A1 | * | 12/2001 | Cooper et al. | 709/217 |
| 2002/0053078 A1 | * | 5/2002 | Holtz et al. | 725/14 |
| 2003/0226142 A1 | * | 12/2003 | Rand | 725/32 |

* cited by examiner

*Primary Examiner*—Christopher Kelley
*Assistant Examiner*—Franklin S Andramuno
(74) *Attorney, Agent, or Firm*—Oblon, Spivak, McClelland, Maier & Neustadt, L.L.P.

(57) ABSTRACT

A content distribution system, content distribution control apparatus, content distribution control method, content distribution control program and content distribution control program storage medium realizes the distribution of content to much more clients. The user PC 4 reserves a distribution channel at the live casting server 150 in order to distribute content to the client PCs 7A, 7B and 7C and requests the live casting server 150 to post program presentation information on the content to be distributed on the distribution channel on the program presentation display screen 160A of the top page screen 160, and the live casting server 150 executes billing processing in response to the request, sends the top page screen 160 having the program presentation display screen 160A including the program presentation information, to the client PCs 7A, 7B and 7C, which thereby allows the client users to see the program presentation information on the program presentation display screen 160A of the top page screen 160 first and increases the chances of selecting the program, resulting in distributing the content to much more client users.

20 Claims, 35 Drawing Sheets

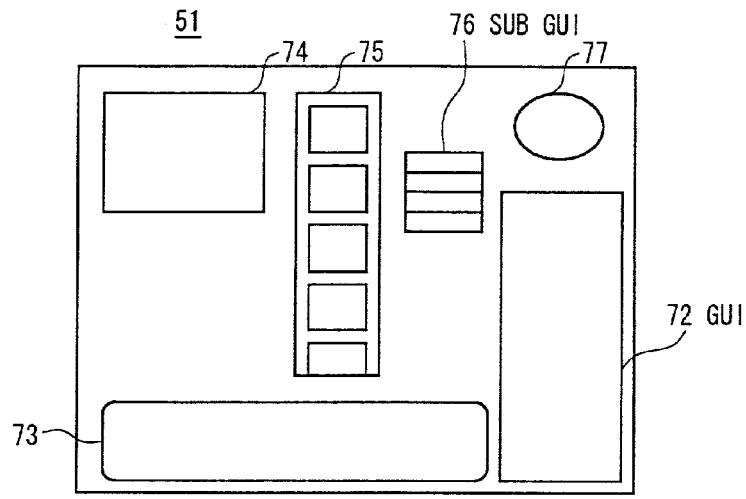
FIG. 7A
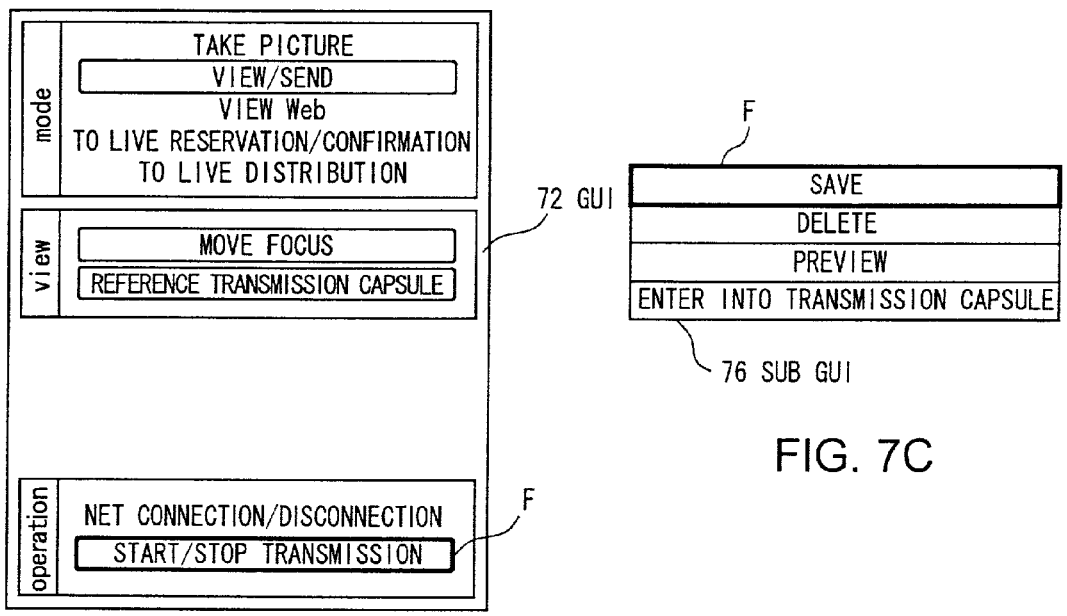
FIG. 7B
FIG. 7C

161C

MEMBER REGISTRATION INPUT SCREEN

210

| INPUT ITEM | INPUT FIELD |
|---|---|
| NAME (KANJI)<br>(ALPHABET)<br>DESIRED USER ID<br>PASSWORD<br>E-MAIL ADDRESS<br>DO YOU DISCLOSE YOUR<br>MAIL ADDRESS? | △○ 太郎<br>○○ TAROU<br>○○○○<br>××××<br>△△△@○○.COM<br>YES |

If you want to get registered as a premium member, check the checkbox and fill the following items.

Register as premium member ☑   211

| INPUT ITEM | INPUT FIELD |
|---|---|
| ADDRESS<br>TELEPHONE NUMBER<br>CREDIT CARD NUMBER<br>CREDIT CARD EXPIRATION DATE<br>CELLULAR PHONE NUMBER<br>FACSIMILE NUMBER | 3-5-5○○CITY○○, ○○<br>03-1234-5670<br>1234-5678-9102<br>MAY, 2003<br>090-1000-2000<br>03-1234-5671 |

CANCEL   REGISTER
 212       213

| New program reservation | | | | | | MYSTUDIO TOP |
|---|---|---|---|---|---|---|
| 1 Use policy ▷ | 2 ENTER TITLE ▷ | 3 Set distribution date/time ▷ | 4 Enter card information ▷ | 5 Authenticate card ▷ | 6 Set connection ▷ | 7 Completed |

Select your preferred date of reservation from the time table below and check the booking situation. Then, enter the date/time you confirmed and the distribution channel corresponding to the number of streams to be distributed.

▽Click on the date, the booking situation of which you want to check.

March

| Sun | Mon | Tue | Wed | Thu | Fri | Sat |
|---|---|---|---|---|---|---|
|  |  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

April

| Sun | Mon | Tue | Wed | Thu | Fri | Sat |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 |  |  |  |  |  |

May

| Sun | Mon | Tue | Wed | Thu | Fri | Sat |
|---|---|---|---|---|---|---|
|  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

Monthly time available for reservation "100" minutes remaining    Monthly time available for reservation "100" minutes remaining    Monthly time available for reservation "100" minutes remaining 165A — Distribution date: [- ▽]M [- ▽]D 165B — Distribution time: [- ▽]H [- ▽]M 165C — Distribution start time: [- ▽]M    Distribution duration: min. "300" minutes available for your distribution 165D — Distribution CH [- ▽]

※ You can cancel your reservation free of charge until 3 hours before the scheduled distribution start time. Note that you will be charged the full amount if this time limit is passed.

165F ⌒( Return )  ( Set )⌒165E

| New program reservation | | | | | | MYSTUDIO TOP |
|---|---|---|---|---|---|---|
| 1 Use policy ▷ | 2 ENTER TITLE ▷ | 3 Set distribution date/time ▷ | 4 Enter card information ▷ | 5 Authenticate card ▷ | 6 Set connection ▷ | 7 Completed |

Title: CONGRATULATION    ~166A

| Reservation date | Reservation time | Channel | Duration | Charge |
|---|---|---|---|---|
| 03/30 | 12:00~12:10 | 123ch(10) | 10min | ¥31,500 |

~166B

| Reservation fee | ¥31,500 |
| Pickup registration fee | ¥500 |
| Broadcasting date discount | 23% |
| Personal discount | ¥-1,200 |
| Sub total | ¥32,000 |
| Consumption tax | ¥1,600 |
| Total | ¥33,600 |

[Enter information of your credit card.]

Card type [Select ▽]
Card number [          ]
(one-byte characters without hyphen [-])
Expiration [- ▽]Month [- ▽]Year
166C ※ Pressing the "Reserve" button starts card authentication. Note that once the card authentication is started, you cannot "Return".
※ You can get a personal discount only once. Please understand that the remainder cannot be used.
※ Please understand that the fractions of the broadcasting date discount will be rounded down.

165F ~( Return )  ( Set )~ 165E

FIG. 20

| New program reservation | | | | | | MYSTUDIO TOP |
|---|---|---|---|---|---|---|
| 1 Use policy ▷ | 2 ENTER TITLE ▷ | 3 Set distribution date/time ▷ | 4 Enter card information ▷ | 5 Authenticate card ▷ | 6 Set connection ▷ | 7 Completed |

The credit card information is now being authenticated.
Please wait for a while.

```
Reservation ID::OOOO
Live distribution reservation date/time:2001:03:30:12:00:00-
                                        2001:03:30:12:10:00
Available server connection time for live:2001:03:30:11:55:00-
                                          2001:03:30:12:15:00
Telephone numbers for connection:
    Carrier 01:03-1234-5670
    Carrier 02:03-1234-5671
    Carrier 03:03-1234-5672
    Carrier 04:03-1234-5673
Information on connection destination server
    Server type:RealServer5
    Server name:LiveServer.com
    Connection port:555
    Stream path to server:/channel1/stream.rm
Information of distribution request destination address:
           rtsp//liveserver.com:554/channel1/stream.rm
Transmission band:   20kbps, 34kbps, 45kbps, 80kbps, 220kbps
Title:  xxxx live
Summary:·········
Disclosure level:·········
Friend list address information
    List01:OO@xx.com
    List02:△△@xx.co.jp
    List03:xx@OO.com
Distribution request password: x x x x x
```

| New program reservation | | | | | | MYSTUDIO TOP |
|---|---|---|---|---|---|---|
| 1 Use policy ▷ | 2 ENTER TITLE ▷ | 3 Set distribution date/time ▷ | 4 Enter card information ▷ | 5 Authenticate card ▷ | 6 Set connection ▷ | 7 Completed |

Title: CONGRATULATION     ~168A

| Distribution date | Start time- End time | Channel | Audience password |
|---|---|---|---|
| 03/30 | 12:00~12:10 | 123ch(10) | ***** |

The connection information for live will be set in the CastaDrive compatible system.
Use the following method for downloading and setting.
Furthermore, be sure to carry out the live with the CastaDrive compatible system used for distribution.
Using IE4.0 or higher will facilitate the setting.
You are recommended to use IE4.0 or higher.

[Setting method]
<When using IE4.0 or higher>
Click on the "Auto setting" button. All settings will be automatically registered.

( Auto setting )  ~168B

<When using other browser>
Click on the "Download" button. This starts downloading of the setting information as a file. Save this file in a proper location.
Load the save file with the CastaDrive compatible software.
The setting information will be registered.

( Download reservation file )  ~168C

| New program reservation | | | | | | MYSTUDIO TOP |
|---|---|---|---|---|---|---|
| 1 Use policy ▷ | 2 ENTER TITLE ▷ | 3 Set distribution date/time ▷ | 4 Enter card information ▷ | 5 Authenticate card ▷ | 6 Set connection ▷ | 7 Completed |

Reservation has been completed.

Title:   CONGRATULATION   ⌒169A

| Distribution date | Start time-End time | Channel | Audience password |
|---|---|---|---|
| 03/30 | 12:00~12:10 | 123ch(10) | ****** |

Only the reservation of a time frame has been completed so far. Click on the "To program presentation page editing" button and register the information of this reserved program. With "Program presentation page editing", you can edit the program title and introductory statement and customize the designs of the presentation page and reproduction page, etc. Try to direct an amusing program.

169C ⌒( Return to MY STUDIO )   ( To program presentation page editing )⌒169B

| New program reservation | MYSTUDIO TOP |
|---|---|

Click on the reservation ID of the program, information of which you want to edit from the following list.

Previous, 1/10 Next

| Reservation ID | Reservation date | Reservation time | Channel | Duration | Charge | Genre |
|---|---|---|---|---|---|---|

Title:   CONGRATULATION

| PC00006a | 03/30 | 12:00~12:10 | 123ch(10) | 10min | ¥31,500 |  Gourmet program |

Title:   CONGRATULATION

| PC00007a | 03/31 | 16:00~16:10 | 135ch(10) | 10min | ¥24,500 |  Live |

| New program presentation page editing | MYSTUDIO TOP |

1 Reservation list ▷ 2 Program presentation/replay page editing ▷ (3 ※For only when title is changed Connection setting) ▷ 4 Completed

171A

| Reservation ID | PC00006a |
|---|---|
| Channel | 1ch(10) |
| Reservation time | Reservation date :03/30<br>Start time:12:00<br>End time:12:10<br>Distribution duration:10分 |

Title [_____] ~171B
(20 two-byte characters)
※If you change this, you need to download the reservation file.

Sub-title [_____] ~171C
(40 two-byte characters)

Genre [Narikiri television station ▽] ~171D

Summary of program [_____] ~171E
(40 two-byte characters)

Details of program [_____] ~171F
(200 two-byte characters:Need to insert carriage return)

Audience password [_____] ~171G
(20 one-byte alphanumeric characters, case-sensitive)

Sender's portrait number [_____] ~171H
(4 one-byte characters/numeric numbers)
(See design)

Production staff [Appearance:_____] ~171I
(200 two-byte characters:Need to insert carriage return)

Delay the time at which the replay button appears.
(User who wants to make a rehearsal check)

[0min ▽] ~171J

| Receive message by e-mail<br>(Address will not be disclosed to third party.)<br>⊙ Accept  ○ Not accept | ~171K |

Recommended homepage (name) related to program

[_____] ~171L
(20 two-byte characters)

Recommended homepage (URL) related to program
☐ ~171M
(512 one-byte alphanumeric characters, case-sensitive)

Post on pickup
○ Posted   ⊙ Not posted   ~171N

Pickup introductory statement setting
~171P
☐
(40 two-byte characters:Need to insert carriage return)

Design of replay page, presentation page
(See design)

|Standard ▼| ~171Q

Item to be questioned on replay page
☐ ~171R
(40 two-byte characters)

Answer to question 1  |YES|  ~171S
(10 two-byte characters)

Answer to question 2  |NO|  ~171T
(10 two-byte characters)

Answer to question 3  |Have no preference|  ~171U
(10 two-byte characters)

~171V    ~171W
[Program presentation preview]  [Replay page preview]

171Y ~(Return to reservation list)  (Editing completed)~171X

| New program presentation page editing | | | MY STUDIO TOP |
|---|---|---|---|
| 1 Reservation list ▷ | 2 Program presentation /replay page editing ▷ | (3 *For only when title is changed Connection setting) ▷ | 4 Completed |
| Program presentation page has been updated. Title: CONGRATULATION | | | |

| Distribution date | Start time ~End time | Channel | Audience password |
|---|---|---|---|
| 03/30 | 12:00~12:10 | 123ch(10) | ****** |

Current time 12:00 (for service supply)

Genre: Rock music
Live title:○○○○
Distributor(mail address):△△△@xx.com
Homepage:http://www.△○△xxx.com
Quota:50people
CLOSE or OPEN Summary
 .........
 .........

Details of presentation
 .........
 .........

Password entry:

[Replay] ~175

NOTE: Replaying this requires replay software.

[Replay software] ~176
Click here to download.

FIG. 32

CONTENT DISTRIBUTION SYSTEM, CONTENT DISTRIBUTION CONTROL APPARATUS, CONTENT DISTRIBUTION CONTROL METHOD, CONTENT DISTRIBUTION CONTROL PROGRAM AND CONTENT DISTRIBUTION CONTROL PROGRAM STORAGE MEDIUM

BACKGROUND OF THE INVENTION

1. Field of the Invention

The present invention relates to a content distribution system, content distribution control apparatus, content distribution control method, content distribution control program and content distribution control program storage medium, and is suitably applicable to, for example, a computer network system that distributes content from a user personal computer (PC) to clients through a predetermined streaming server.

2. Description of the Related Art

In a computer network system, when, for example, content created by an individual are provided over the Internet, it is a general practice that the individual opens a homepage.

When the individual opens a homepage in this way, the user acquires a homepage creation program through a user PC, creates a homepage hyper-linked with a plurality of content based on the homepage creation program and stores the homepage in a streaming server of an Internet service provider (hereinafter referred to as "ISP").

Then, the ISP provides a client who gets access over the Internet with the homepage from the streaming server and then provides, in response to clicking on an anchor on the homepage, content linked with the anchor.

The streaming server also stores moving images and voice, etc. in addition to still images as content uploaded from the user PC, and can thereby realize a live distribution by carrying out a stream distribution of live content, etc. made up of moving images over the Internet in response to a request from a client.

However, the computer network system in the above-described configuration has a problem that when a user wants content to be distributed to an indefinite number of client users, the user cannot be sure whether the content created by the user will always be selected by the indefinite number of client users and there is also a possibility that the stream distribution will not be executed for a desired number of client users.

SUMMARY OF THE INVENTION

In view of the foregoing, an object of this invention is to provide a content distribution system, content distribution control apparatus, content distribution control method, content distribution control program and content distribution control program storage medium capable of distributing content to much more client users.

The foregoing object and other objects of the invention have been achieved by the provision of a content distribution system constructed of a user terminal and a content distribution server that distributes content received from the user terminal to clients over a network. The user terminal reserves a distribution channel on which content is distributed to clients via the content distribution server, requests the content distribution server to post predetermined information on the content to be distributed on the distribution channel on the top page of a site in the content distribution system, while the content distribution server executes billing processing in response to such a request, sends the top page on which the predetermined information on the content is posted to the clients and allows the client users to see the top page on which the content information in personal broadcasting is posted, thus making it possible to naturally increase the probability that the client users will select the content and thereby distribute the content to much more client users.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A to 7C are schematic diagrams showing an overall configuration of an upload mode screen;

FIG. 14 is a schematic diagram showing a member registration input screen;

FIG. 19 is a schematic diagram showing a broadcasting date/time setting screen;

FIG. 20 is a schematic diagram showing a payment screen;

FIG. 21 is a schematic diagram showing a payment in progress screen;

FIG. 22 is a schematic diagram showing the contents of a reservation setting information file;

FIG. 23 is a schematic diagram showing a reservation setting information file acquisition setting screen;

FIG. 24 is a schematic diagram showing a reservation completion screen;

FIG. 25 is a schematic diagram showing an editing object selection screen;

FIG. 26 is a schematic diagram showing a program presentation page editing screen (1);

FIG. 27 is a schematic diagram showing a program presentation page editing screen (2);

FIG. 28 is a schematic diagram showing an editing update notification screen;

FIG. 32 is a schematic diagram showing a detailed information display screen;

DETAILED DESCRIPTION OF THE EMBODIMENT

Figure 1:
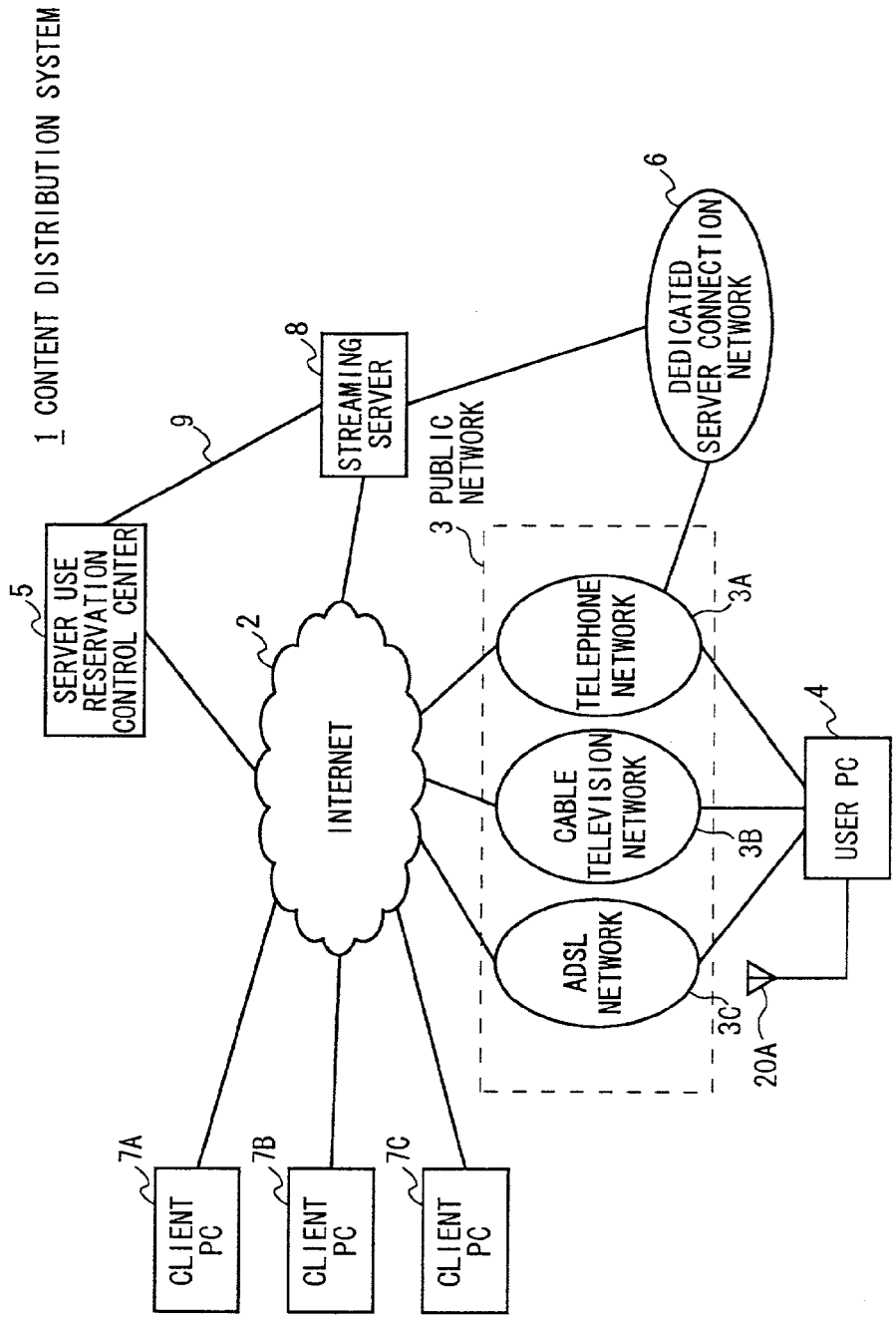
FIG. 1 is a schematic diagram showing an overall configuration of a content distribution system according to an embodiment of the present invention.

Preferred embodiments of this invention will be described with reference to the accompanying drawings:

(1) Content Distribution System (1-1) Overall Configuration of Content Distribution System In FIG. 1, reference numeral 1 denotes an overall content distribution system of the present invention and this content distribution system 1 is designed to realize a personal casting service which will be described later.

This content distribution system 1 is constructed of a content provider's user personal computer (PC) 4 connected to the Internet 2 via an internet service provider (ISP), which is not shown, and a public network 3 (telephone network 3A, cable TV network 3B or Asymmetric Digital Subscriber Line (ADSL) network 3C), a server use reservation control center 5 connected to the Internet 2 and a streaming server 8 that performs a stream distribution of content transmission received from the user PC 4 through the public network 3 or dedicated server connection network 6 over the internet 2 to a plurality of client PCs 7A, 7B and 7C.

In this case, when sending content transmission to the streaming server 8, the user PC 4 is designed to make a Point to Point Protocol (PPP) connection to an access port of the dedicated server connection network 6 through, for example, the telephone network 3A of the public network 3 and establish a transmission path with the streaming server 8 to ensure that content is sent to the streaming server 8 through the transmission path.

The user PC 4 is also designed to be able to connect to the streaming server 8 from the public network 3 via the ISP and Internet 2, in which case the user PC 4 can send content to the streaming server 8 through a transmission path arbitrarily selected from among the telephone network 3A, cable TV network 3B and ADSL network 3C to which the user PC 4 is connectable.

The streaming server 8 is designed to be able to perform a stream distribution of content received from the user PC 4 via the dedicated server connection network 6 or the Internet 2, to a plurality of client PCs 7A, 7B and 7C over the Internet 2.

Furthermore, the streaming server 8 is also connected to the server use reservation control center 5 with a dedicated line 9 and designed to mutually send/receive authentication data through the dedicated line 9 during authentication processing for the user PC 4, client PCs 7A, 7B and 7C.

The user PC 4 actually requests the server control reservation center 5 for a reservation of a time zone in which the stream distribution function of the streaming server 8 is used and gets the reservation registered in the streaming server 8 via the server control reservation center 5.

In the reserved time zone which is reserved and registered by the user PC 4, the streaming server 8 receives the content sent from the user PC 4 through the dedicated server connection network 6, stores the content in a buffer, reads the content and performs stream distribution of the content to the requesting client PC 7A, 7B or 7C.

This allows the content distribution system 1 to provide the content sent from the user PC 4 to the client PC 7A, 7B or 7C in real time in a predetermined reserved time zone via the streaming server 8, that is, to realize a personal broadcasting station or personal casting service.

This embodiment will explain a case where the streaming server 8 with a stream distribution function is used. However, if it is possible to provide content in real time, content can also be provided using a server with various other functions.

(1-2) Configuration of User PC

Then, a configuration of the user PC 4 used to send content such as music live, etc. filmed by a content provider who acts as a broadcaster to the streaming server 8 will be explained.

Figure 2:
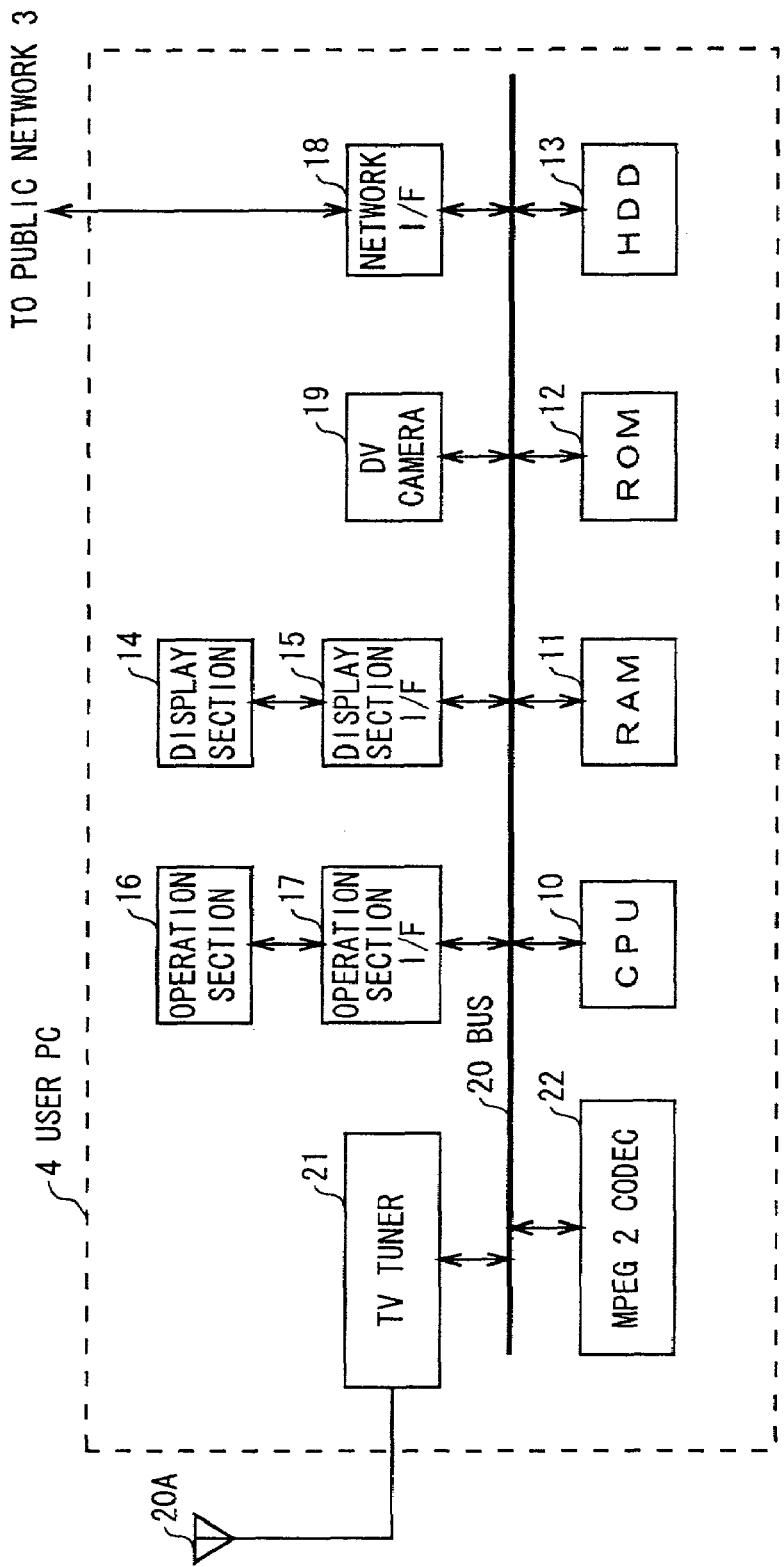
FIG. 2 is a block diagram showing a circuit configuration of a user PC.

As shown in FIG. 2, the user PC 4 is constructed of a central processing unit (CPU) 10 that executes various types of operation processing and controls circuit sections, a random access memory (RAM) 11 used as a work area of the CPU 10, a read only memory (ROM) 12 that stores a series of program groups to be executed by the CPU 10, a hard disk 13 that stores program groups such as an operating system (for example, "Windows 95/98/2000" (Microsoft Corporation)) and application programs to be executed by the CPU 10, a display section 14 made up of a liquid crystal display, etc. that receives and displays the processing results of the CPU 10 through a bus 20 and display interface 15, an operation section 16 made up of a keyboard for a content provider to input instruction, mouse, operation buttons such as a jog dial that can be turned or pressed to be described later, an operation section interface 17 that sends an instruction input from the operation section 16 to the CPU 10 through the bus 20, a network interface 18 to send/receive data to/from an external device connected to the Internet 2 (FIG. 1) or the dedicated server connection network 6 through the public network 3, a digital video camera 19 attached as one body with the user PC 4 and Moving Picture Experts Group (MPEG)2 CODEC 22 that compresses and encodes content according to the MPEG2 standard. The hard disk 13 is read/written by the CPU 10 and also used to store content and various kinds of control data.

Figure 3A:
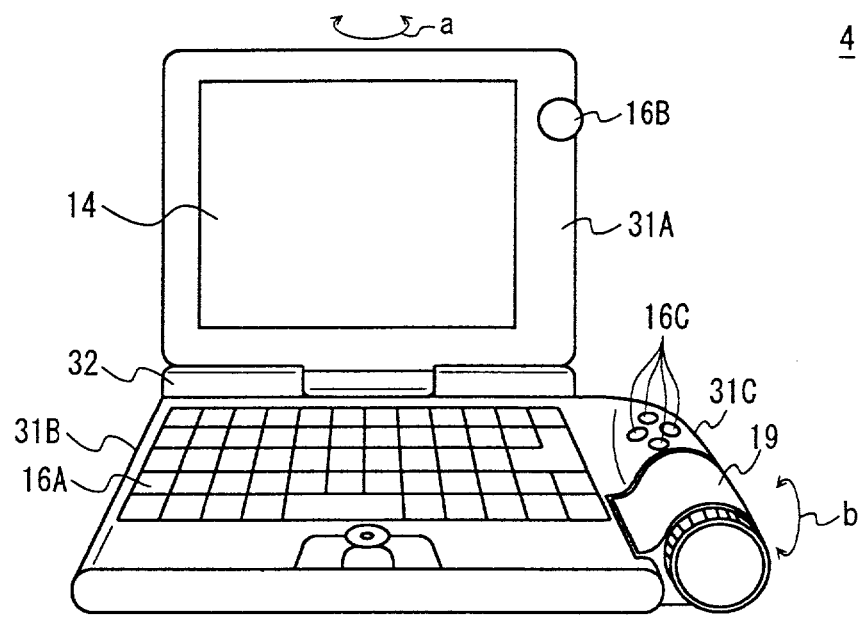
FIGS. 3A and 3B are schematic perspective views showing an external configuration (1) of the user PC.

Here, as shown in FIG. 3A, the user PC 4 includes a display side cabinet section 31A provided with a display section 14 made up of a liquid crystal display and a keyboard side cabinet section 31B provided with a keyboard 16A, both of which are connected in a mutually pivotable manner on a hinge section 32.

Figure 3B:
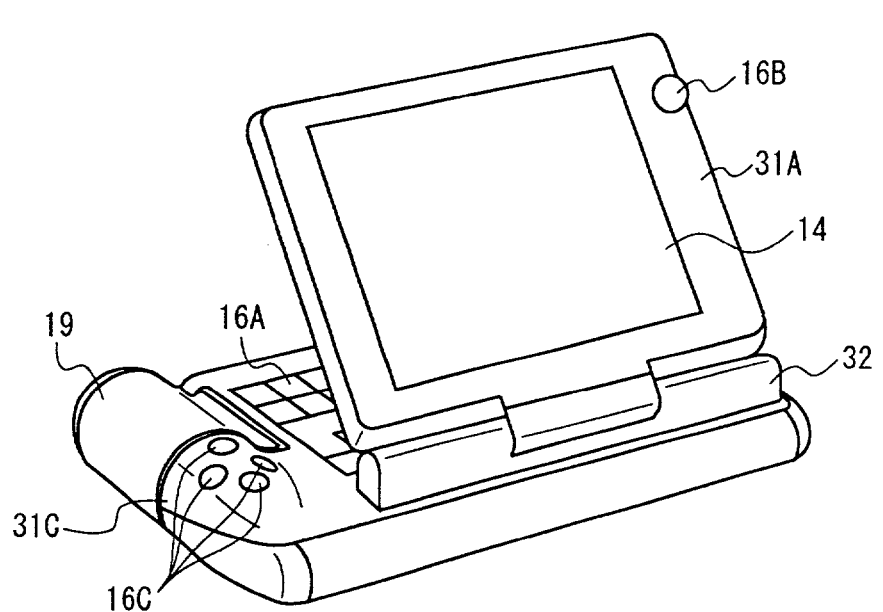

The display side cabinet section 31A is attached to the keyboard side cabinet section 31B in such a way that it is pivotable in the direction indicated by an arrow "a" and as shown in FIG. 3B, the display side cabinet section 31A can be used turned by 180 degrees and a jog dial 16B is provided above right end of the display side cabinet section 31A in such a way that it can be turned or pressed.

On the keyboard side cabinet 31B, an operation button cabinet section 31C with a plurality (4 types) of operation buttons 16C is attached and fixed to the right end of the keyboard side cabinet section 31B and a digital video camera 19 is supported at one point of the right side end face in such a way as to be pivotable in the direction indicated by an arrow "b".

Figure 4A:
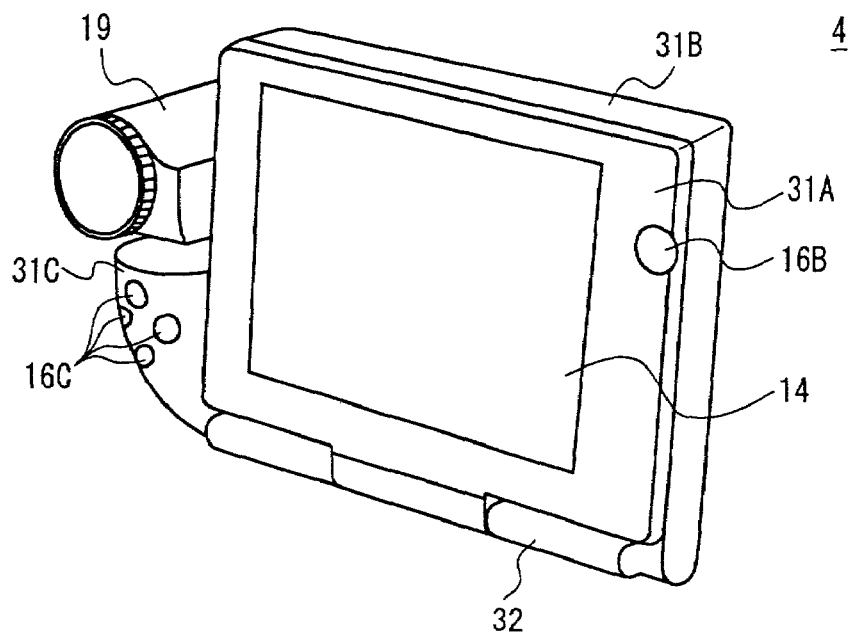
FIGS. 4A and 4B are schematic perspective views showing an external configuration (2) of the user PC.

By the way, the user PC 4 can be used in a mode shown in FIG. 4A and in this case the content provider holds the user PC 4 to take pictures of the content provider himself/herself using the digital video camera 19. In this case, since the display section 14 faces the content provider, the content provider can take pictures while viewing the contents of the pictures on the display section 14.

However, when the user PC 4 is used in this mode, since the keyboard 16A is located behind the display section 14, the content provider cannot operate the apparatus correctly using the keyboard 16A.

Considering this point, the user PC 4 is designed to make it possible to take pictures using the digital video camera 19 and enter instructions for picture taking (for example, instructions for starting and stopping picture taking, zooming, addition of effects, saving of content, transmission, etc.) by appropriately operating the jog dial 16B and operation buttons 16C.

Figure 4B:
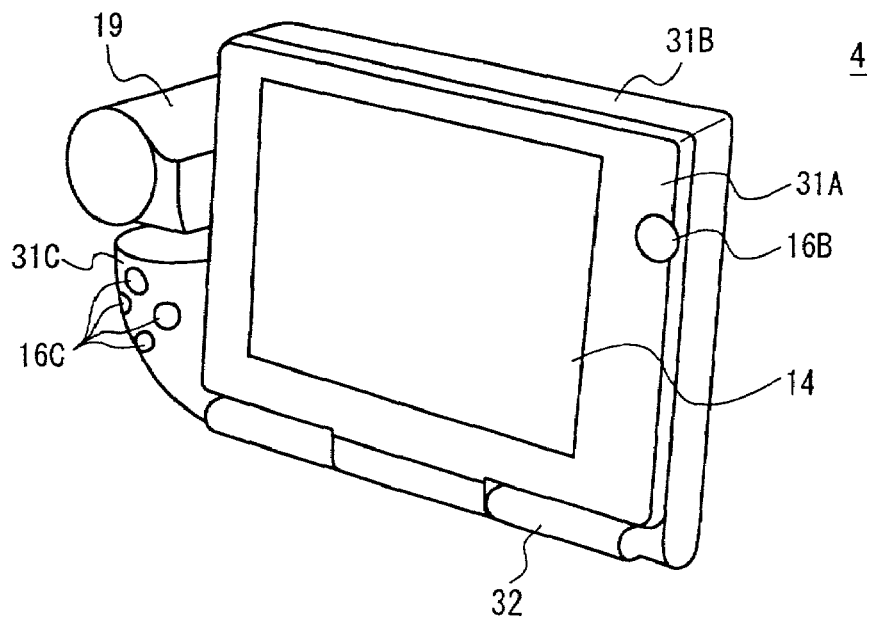

Furthermore, the user PC 4 can also be used in a mode shown in FIG. 4B, in which case the content provider is allowed to hold the user PC 4 and take pictures using the digital video camera 19 while viewing the front object on the display section 14.

The user PC 4 (FIG. 2) executes various types of processing such as picture taking processing, content processing, transmission of the content to the streaming server 8 and World Wide Web (WWW) browsing by the CPU 10 reading and executing various program groups stored in the ROM 12 and hard disk 13 upon powering-on.

Figure 5:
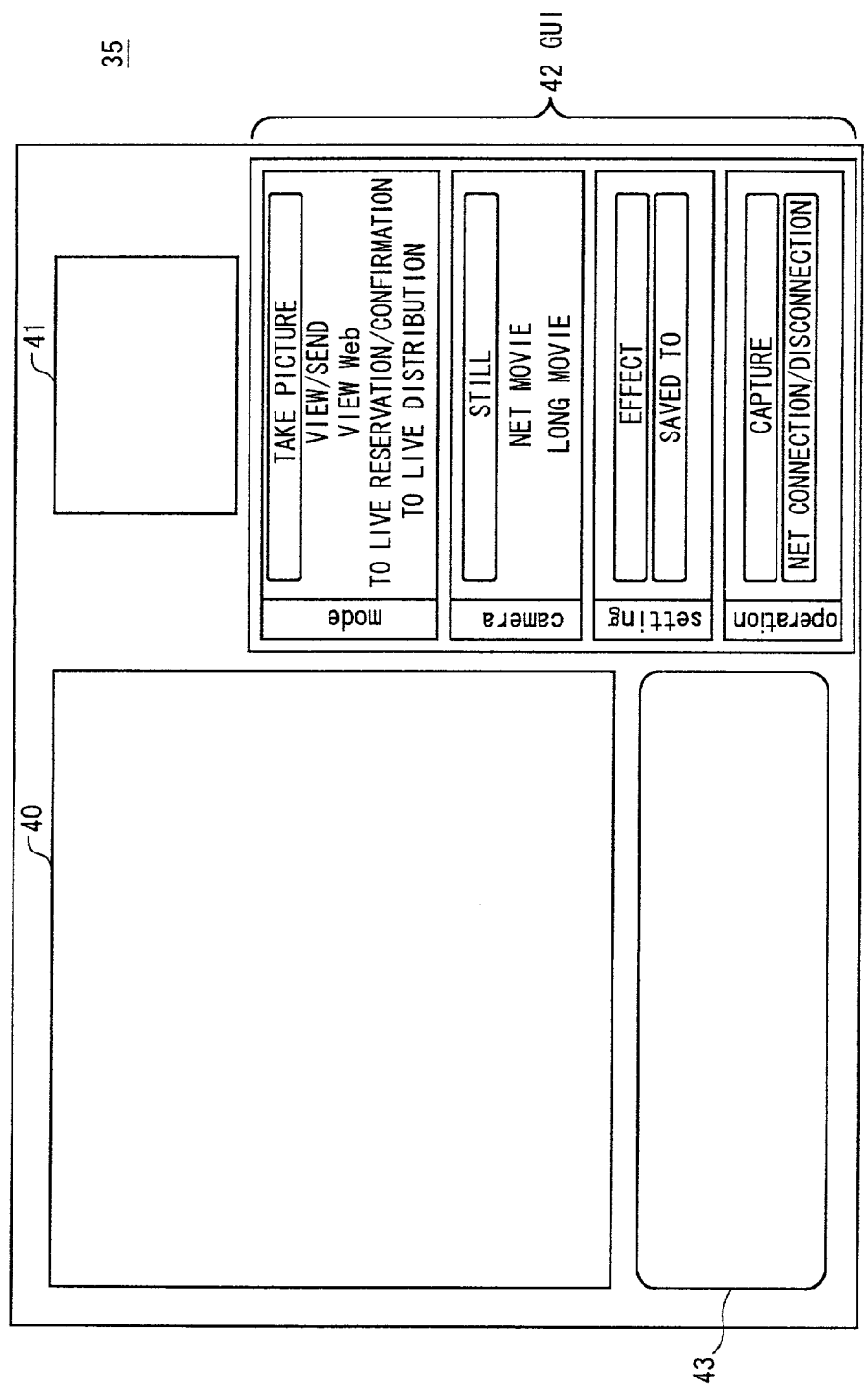
FIG. 5 is a schematic diagram showing an initial screen at the time of starting an application program by the user PC.

The various functions realized by the CPU 10 of the user PC 4 executing predetermined processing according to the above-described various program groups will be explained more specifically below. First, the user PC 4 displays an initial screen 35 shown in FIG. 5 on the display section 14 under the control of the CPU 10.

This initial screen 35 provides a large-size main image display area 40 to display an image taken by the digital video camera 19, a small-size sub-image display area 41 to display a preview of the last image taken at the time of previous image taking, and below the sub-image display area 41 is a graphical user interface (GUI) 42 to allow the content provider to select main items such as mode (mode), image type (camera), setting (setting) and instruction content (operation) and below the main image display area 40 is a status window 43 to show various states of the user PC 4.

The main item "mode" of the GUI 42 displays 5 types of modes as selection targets; picture taking mode (mode when "Take picture" is selected), upload mode (mode when "View/send" is selected), Web check mode (mode when "View Web" is selected), live reservation/confirmation mode (mode when "To live reservation/confirmation" is selected), and live distribution mode (mode when "To live distribution" is selected). When the user PC 4 is started, the picture taking mode is initially selected.

Figure 6A:
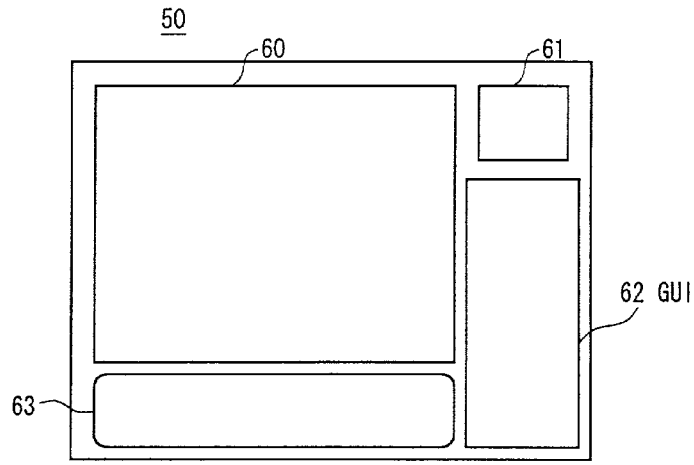
FIGS. 6A and 6B are schematic diagrams showing an overall configuration of a picture taking mode screen.

Here, the picture taking mode is a mode for the digital video camera 19 of the user PC 4 to take pictures and when this picture taking mode is selected or in the initial state, the CPU 10 shows a picture taking mode screen 50 shown in FIG. 6A on the display section 14.

This picture taking mode screen 50 is provided with a main image display area 60 and sub-image display area 61 as in the case of the above-described initial screen 35 (FIG. 5) and the a main image display area 60 shows the image currently being taken and the sub-image display area 61 shows a preview of the last picture taken at the time of the previous picture taking.

Figure 6B:
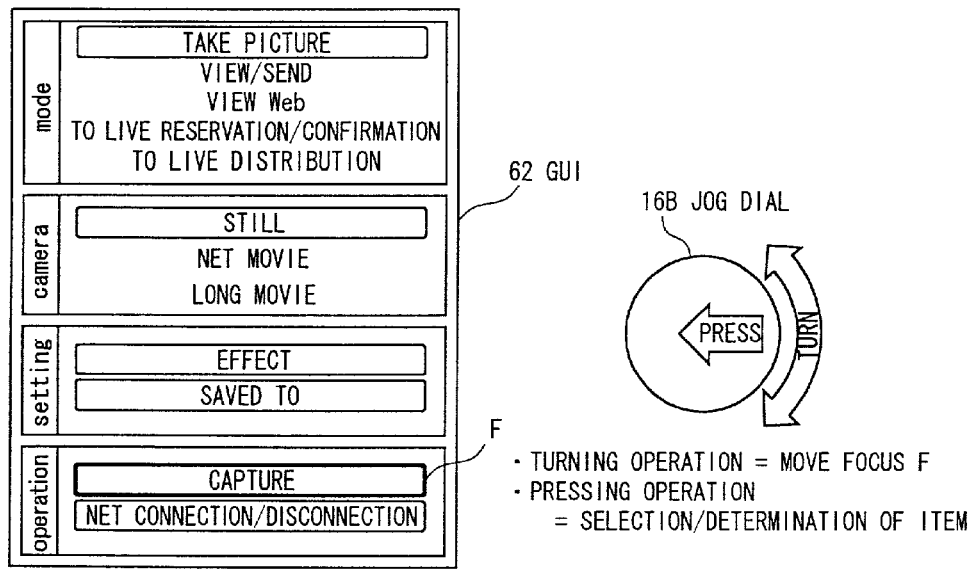

Furthermore, the picture taking mode screen 50 is also provided with a GUI 62 in the same way as the initial screen 35, and as shown in FIG. 6B, this GUI 62 is also provided with main items such as "mode", "camera", "setting" and "operation".

These main items have a plurality of sub-items and when a focus F indicated by a heavy-line frame moves to a desired sub-item according to a turning operation of the jog dial 16B of the display side cabinet section 31A and when the jog dial 16B is pressed, the sub-item is selected and determined.

In the picture taking mode, the operation buttons 16C of the operation button cabinet section 31C (FIGS. 3A and 3B and FIGS. 4A and 4B) are also assigned predetermined commands (for example, a command to select/determine an effect item to apply a special effect to images during picture taking) beforehand.

Therefore, the content provider can perform various operations in the picture taking mode by only operating the jog dial 16B or operation buttons 16C without using the keyboard 16A, and can thereby easily perform picture taking operations even in an environment in which it is difficult to use the keyboard 16A as in the case shown in FIGS. 4A and 4B.

In the picture taking mode, the operation buttons 16C are assigned commands to select/determine effect items beforehand by default to apply special effects to images during picture taking, but it is also possible to assign any commands to the operation buttons 16C or assign various other commands to the operation buttons 16C in other modes. In this case, the operability of the user PC 4 will be further improved.

In the picture taking mode, the status window 63 shows the status of the user PC 4 at the current time point (for example, remaining amount of battery, remaining storage capacity of the hard disk 13, etc.), processing status in the selected mode (for example, size of image data being taken, specified destination of saving image data and types of commands assigned to the operation buttons 16C, etc.).

Then, the upload mode is a mode to allow the content provider to reference the content taken in the above-described picture taking mode on the display section 14 or to send the image data of the content to the streaming server 8 as the upload destination connected to the Internet 2 and the CPU 10 shows an upload mode screen 51 shown in FIG. 7A on the display section 14.

This upload mode screen 51 is provided with a GUI 72 and a status window 73 in the same way as the picture taking mode screen 50 (FIGS. 6A and 6B) and is additionally provided with a preview area 74, a list display area 75 that displays a plurality of representative still images of the captured content in series and a transmission capsule icon 77.

As shown in FIG. 7B, the GUI 72 on the upload mode screen 51 includes an "operation" item and a "view" item in addition to the "mode" item.

The "operation" item includes a "Net connection/disconnection" item to instruct connection/disconnection with the Internet 2 and a "Start/stop transmission" item to instruct start/stop of transmission of content as sub-items. The "view"

item includes a "Move focus" item to instruct to move the focus F to the list display area 75 and a "See transmission capsule" item to check the contents of the transmission capsule icon 77, that is, for the content provider to reference a list of content selected to be sent, as sub-items.

This GUI 72 is also provided with sub-items as in the case of the picture taking mode screen 50 (FIGS. 6A and 6B) and when the focus F moves to a desired sub-item according to a turning operation of the jog dial 16B of the display side cabinet section 31A and when the jog dial 16B is pressed, the sub-item is selected and determined.

In the upload mode, the operation buttons 16C (FIGS. 3A and 3B and FIGS. 4A and 4B) are assigned commands for instructing replay/stop of the content displayed in the preview area 74 and display of a still image beforehand and the status window 73 shows the file name of image data, file size, format (Joint Photographic Experts Group (JPEG) or MPEG, etc.) or information indicating the currently specified transmission destination (server name at the upload destination and Uniform Resource Locator (URL)), etc.

Here, the CPU 10 moves the focus F to the "Move focus" item according to the turning operation of the jog dial 16B by the content provider, and when the CPU 10 recognizes that the "Move focus" item is determined according to the pressing operation of the jog dial 16B, the CPU 10 moves the focus F to the list display area 75.

The content provider can move the focus F to a still image of the list display area 75 by turning the jog dial 16B when the focus F has been moved to the list display area 75. Then, the content provider can easily select a desired still image and determine the content to be sent by pressing the jog dial 16B when the focus F has been moved to the desired still image.

At this time, the CPU 10 displays a sub GUI 76 next to the list display area 75 and displays items of the sub GUI 76 with the focus F moving from one item to another as shown in FIG. 7C.

The sub GUI 76 is provided with selection items such as a "Save" item, "Delete" item, "Preview" item and "Put in transmission capsule" item. When the "Put in transmission capsule" item is selected/determined with the focus F by turning and pressing operations of the jog dial 16B, the CPU 10 adds the selected/determined content from the list display area 75 to the list of content to be sent of the transmission capsule icon 77.

Then, when the content provider returns the focus F to the GUI 72 and the "Start/stop transmission" item is selected/determined with the focus F, the CPU 10 sends all content including the above-described content added to the transmission capsule icon 77 to the upload destination server.

Figure 8A:
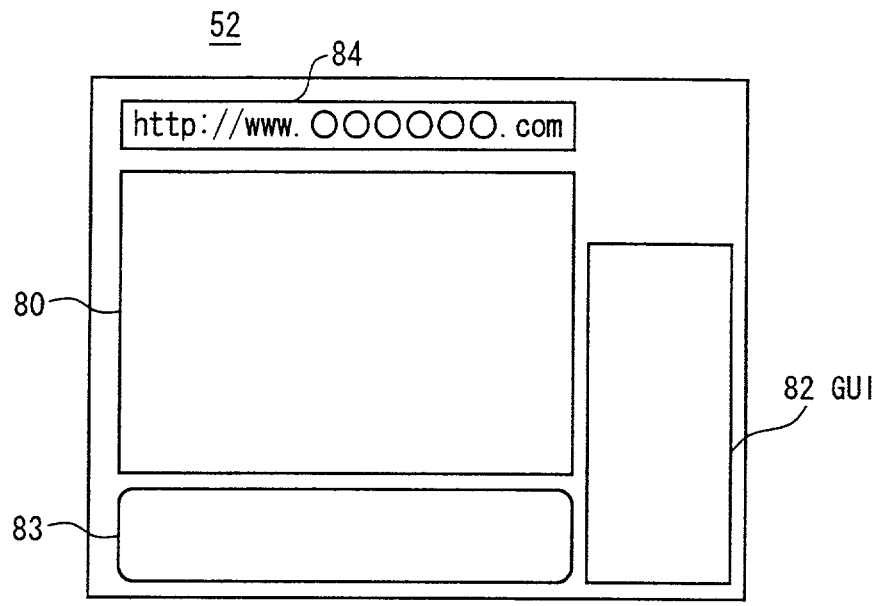
FIGS. 8A and 8B are schematic diagrams showing an overall configuration of a Web confirmation mode screen.

Then, the Web confirmation mode is a mode to connect to the Internet 2 and perform browsing and when the Web confirmation mode is selected, the CPU 10 displays a Web confirmation mode screen 52 shown in FIG. 8A on the display section 14.

This Web confirmation mode screen 52 is provided with a GUI 82 and a status window 83 similar to those in the picture taking mode screen 50 (FIGS. 6A and 6B) and is additionally provided with a browser display area 80 to display a Web browser and a URL display field 84 to display the URL of a resource displayed in the browser display area 80.

When the Web confirmation mode is selected here, the CPU 10 reads browser software (for example, Internet Explorer (Microsoft Corporation) or Netscape Navigator (Netscape Communications Inc.)) from the hard disk 13 and executes it to display a browsed image by the browser software in the browser display area 80.

Figure 8B:
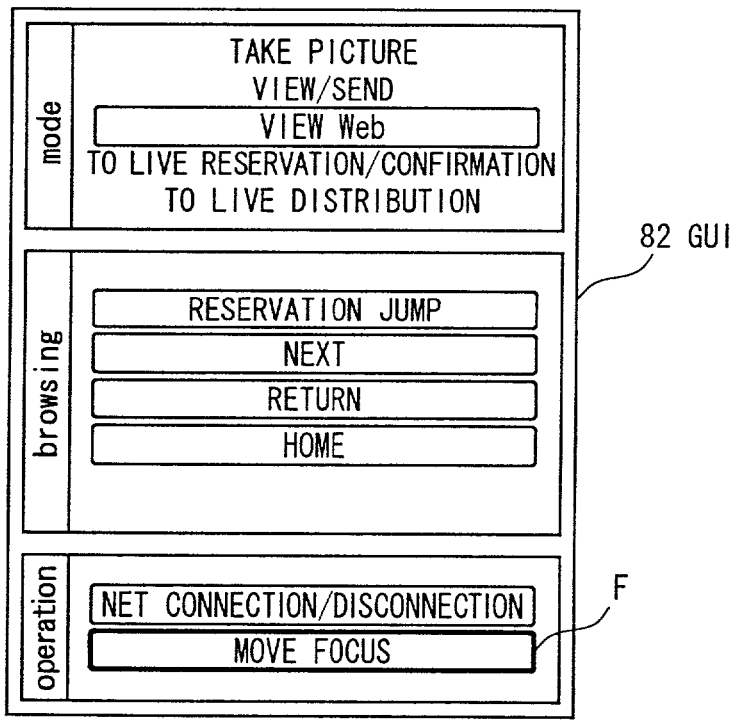

Furthermore, as shown in FIG. 8B, the GUI 82 of the Web confirmation mode screen 52 is provided with a new "browsing" item instead of the "setting" item and "camera" item in the initial screen 35.

This "browsing" item is provided with sub-items such as a "Reservation jump" item to instruct a jump to a desired Web page, a "Next" item and a "Return" item to operate the browser. In this Web confirmation mode, it is also possible to perform general browsing processing such as entering a URL and performing browsing.

As in the case of the picture taking mode screen 50, this GUI 82 is also designed to select/determine a desired sub-item when the focus F moves to the sub-item according to a turning operation of the jog dial 16B of the display side cabinet section 31A and when the jog dial 16B is pressed.

Figure 9A:
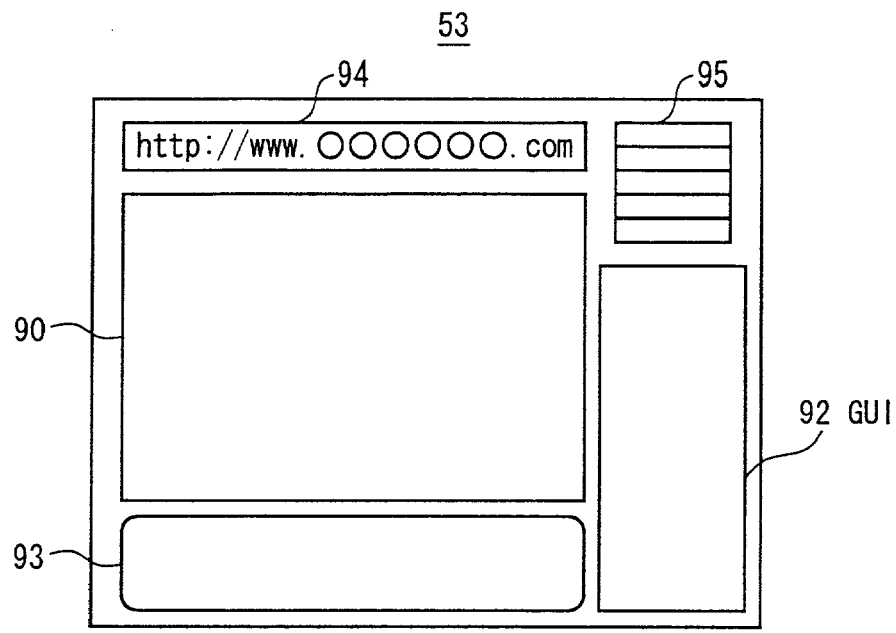
FIGS. 9A and 9B are schematic diagrams showing an overall configuration of a live reservation/confirmation mode screen.

Then, the live reservation/confirmation mode is a mode to reserve a time zone to conduct personal broadcasting of content in live broadcast using the stream distribution function of the streaming server 8 and once the live reservation/confirmation mode is selected, the CPU 10 displays a live reservation/confirmation mode screen 53 shown in FIG. 9A on the display section 14.

This live reservation/confirmation mode screen 53 is provided with a browser display area 90, a GUI 92, a status window 93 and a URL display field 94 as in the case of the Web confirmation mode screen 52 (FIGS. 8A and 8B) and also provided with a new reservation list display area 95.

Figure 9B:
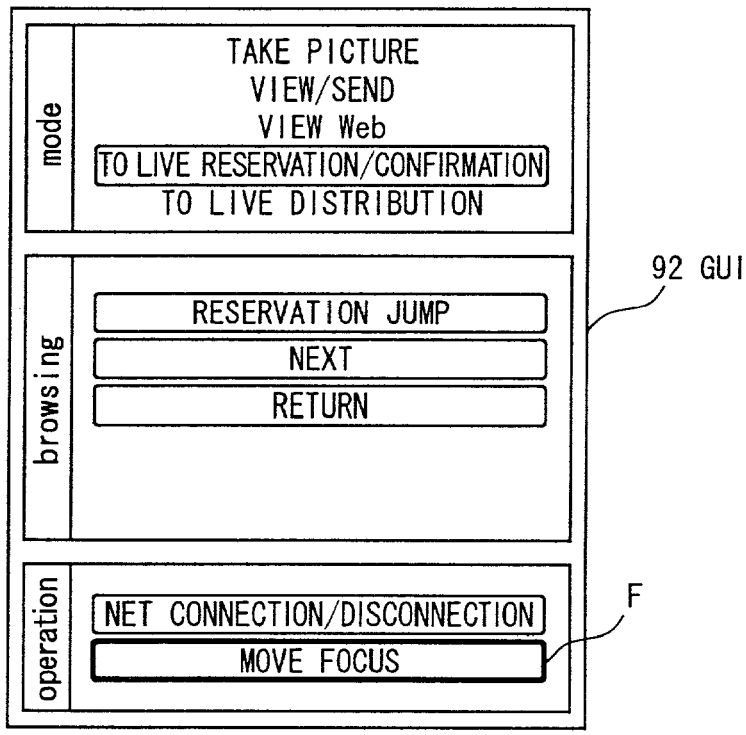

Furthermore, as shown in FIG. 9B, the GUI 92 of the live reservation/confirmation mode screen 53 is provided with a "mode" item, an "operation" item and "browsing" item as in the case of the GUI 82 of the Web confirmation mode screen 52 (FIGS. 8A and 8B) and the "browsing" item" is provided with a "Reservation jump" item to instruct a jump to a desired Web page to make a live reservation, a "Next" item and a "Return" item to operate the browser.

Furthermore, as in the case of the Web confirmation mode screen 52, this GUI 92 is also designed to select/determine a desired sub-item when the focus F moves to the sub-item according to a turning operation of the jog dial 16B of the display side cabinet section 31A and when the jog dial 16B is pressed.

By the way, the Web page to make a live reservation is a Web page of the reservation screen to make a live reservation stored by the live casting server in the server use reservation control center 5, which will be described later, in its hard disk.

When the content provider selects/determines the "Reservation jump" item using the focus F, the CPU 10 of the user PC 4 gets access to the live casting server in the server use reservation control center 5 to send/receive various kinds of data related to a live reservation such as sending reservation request information to the live casting server or downloading a live reservation setting information file from the live casting server.

The reservation list display area 95 on the live reservation/confirmation mode screen 53 shows a list of reservation items of a live reservation made at the server use reservation control center 5 and displays outline information such as the time zone, set for each of the reservation items.

When any reservation item of the reservation list display area 95 is selected/determined with the focus F through turning and pressing operations of the jog dial 16B by the content provider, the CPU 10 controls the live casting server in the server use reservation control center 5 to jump to the Web page of the reservation confirmation screen showing the reservation contents of the relevant reservation item. The processing related to a live reservation between the CPU 10 of the user PC 4 and the server use reservation control center 5 in this case will be described later.

Next, the live distribution mode is a mode to distribute the content taken by the digital video camera 19 of the user PC 4 to the client PCs 7A, 7B and 7C in real time using the stream distribution function of the streaming server 8 over the Internet 2, just like a personal broadcasting station.

Figure 10A:
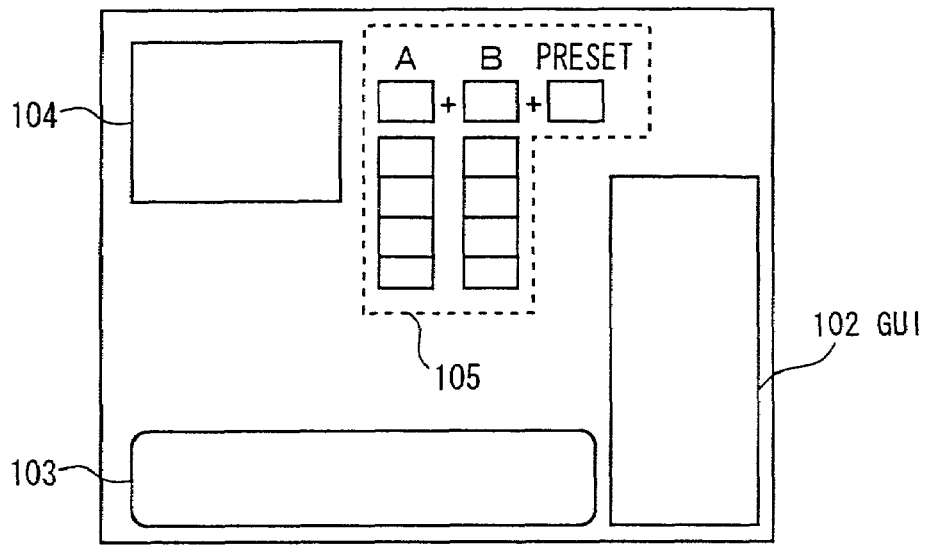
FIGS. 10A and 10B are schematic diagrams showing an overall configuration of a live distribution mode screen.

Actually, when the content provider selects the live distribution mode, the CPU 10 of the user PC 4 displays a live distribution mode screen 54 shown in FIG. 10A on the display section 14.

This live distribution mode screen 54 is provided with an effect item display field 105 to select the type of a special effect to be applied to live-distributed moving image data and a preview image display area 104 to display the effect image to which the special effect is applied in addition to the GUI 102 and status window 103. By the way, the effect image displayed in this preview image display area 104 becomes the image of the content to be actually sent to the streaming server 8.

The status window 103 in this case displays distribution information indicating that a live distribution is in progress, live distribution elapsed time information indicating an elapsed time after the live distribution is started, time information on the service provider side of a personal casting service, time information of the user PC 4, time zone information indicating a reservation start time or reservation end time of the live distribution, image size information, bit rate information indicating the transmission rate (bit rate) of distribution data, content title name information, connection destination information indicating the streaming server 8 being connected and its channel, and viewership information indicating the number of the client PCs 7A, 7B and 7C who are receiving content stream-distributed by the streaming server 8, etc.

Figure 10B:
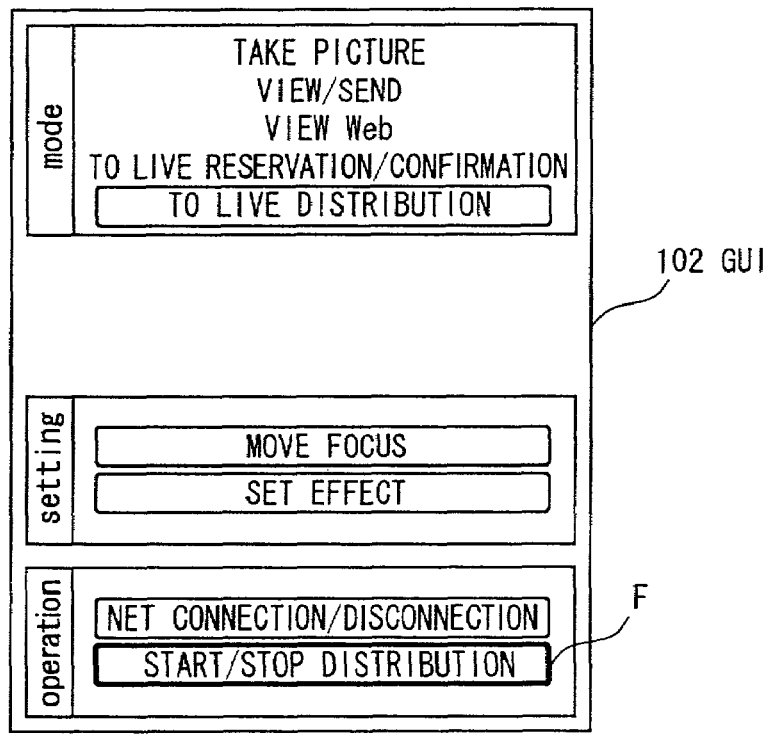

As shown in FIG. 10B, the GUI 102 of the live distribution mode screen 54 is provided with a "mode" item, an "operation" item and a "setting" item, and the "operation" item is provided with a "Net connection/disconnection" item to instruct connection/disconnection with the Internet 2 and a "Start/stop distribution" item to instruct start/stop of live distribution.

Furthermore, the "setting" item is provided with a "Set effect" item to select the type of a special effect to be applied to the moving image data of the content and a "Move focus" item to move the focus F to the effect item display field 105 as sub-items.

The "Set effect" item is intended to select an effect item to be applied to the moving image data of the content and display the selected effect item in the effect item display field 105.

Furthermore, the "Move focus" item is designed to select/determine a desired sub-item after moving the focus F to the effect item display field 105, moving the focus F to the sub-item in the effect item display field 105 according to the turning operation of the jog dial 16B and then the pressing operation of the jog dial 16B.

Here, when the "Start/stop distribution" item is selected/determined by the focus F through the turning and pressing operations of the jog dial 16B, the CPU 10 of the user PC 4 establishes a transmission path with the streaming server 8 through a connection by a dedicated line over the dedicated server connection network 6 or through an Internet connection over the Internet 2 according to the reservation setting information file for the live distribution supplied from the live casting server in the server use reservation control center 5 in the above-described live reservation/confirmation mode.

Then, the CPU 10 of the user PC 4 sends the moving image data with the content taken by the digital video camera 19 to the streaming server 8 in real time according to the contents (for example, data transmission rate, etc.) set in the reservation setting information file.

Thus, the user PC 4 stores an application program provided with the above-described five functions of the picture taking mode, upload mode, Web confirmation mode, live reservation/confirmation mode and live distribution mode in the hard disk 13 and has the above-described various processing functions, and further stores an application program to automatically incorporate a reservation setting information file which will be described later during a live reservation of live distribution and an application program to execute processing of communication/connection with the streaming server 8 during a live distribution, and the functions executed by these application programs will be described in detail later.

(1-3) Configuration of Server Use Reservation Control Center

As described above, when the user PC 4 sends moving image data of content as the live distributor to the streaming server 8, in the personal casting service by the content distribution system 1, a reservation/registration is firstly required to use the stream distribution function of the streaming server 8 in the time zone during which content are to be distributed first.

Figure 11:
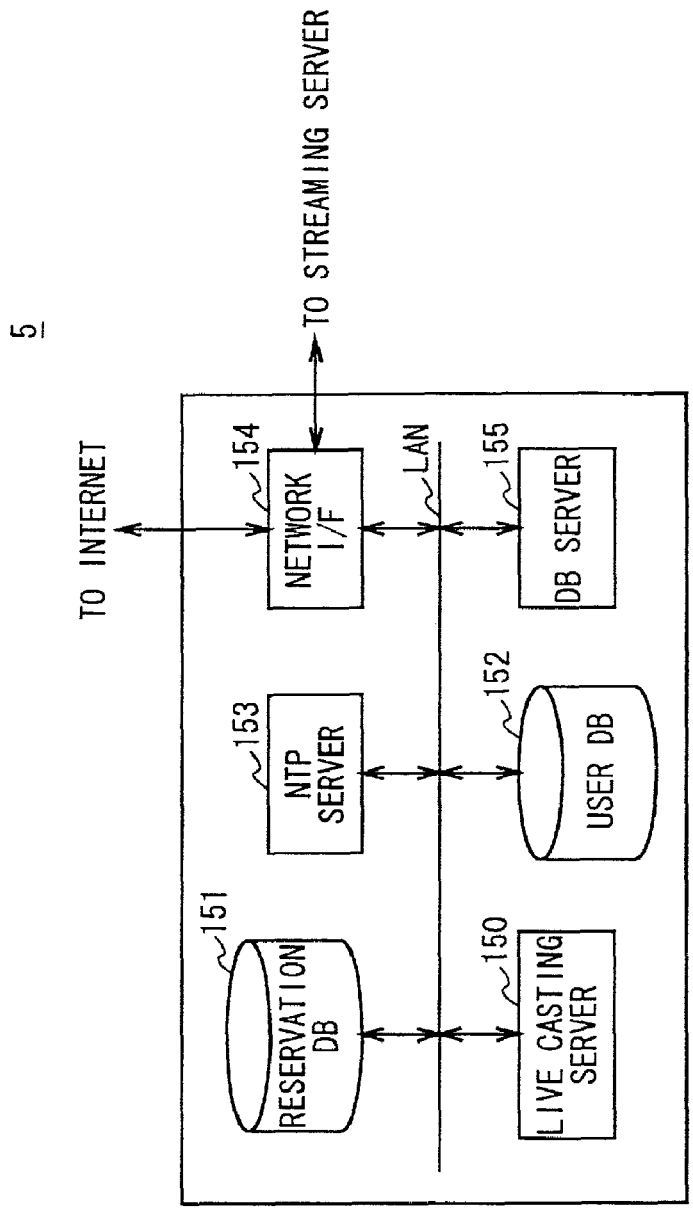
FIG. 11 is a block diagram showing a configuration of a server use reservation control center.

Now, the server use reservation control center 5 on the service provider side who controls a reservation/registration of the streaming server 8 will be explained with reference to FIG. 11.

The server use reservation control center 5 is constructed of a live casting server 150, a reservation database 151, a user database 152, an Network Time Protocol (NTP) server 153, a network interface 154 and a database server 155 connected to each other with a local area network (LAN).

Here, the server use reservation control center 5 sends/receives various data to/from the user PC 4 connected to the Internet 2 through the network interface 154, the client PCs 7A, 7B and 7C and the streaming server 8 connected through the dedicated line 9 (FIG. 1).

The live casting server 150 of the server use reservation control center 5 is designed to perform control over all personal casting services such as reservation/registration of a live distribution, billing processing and member registration processing.

Furthermore, the live casting server 150 stores a registration Web page for the content provider to acquire the right to use the personal casting service, a reservation acceptance Web page to accept a live reservation of a live distribution by the content provider, a reservation confirmation Web page for the content provider to confirm or change the reservation, and a program guide Web page for the client PC 7A, 7B or 7C to reference a program table related to a live distribution, in the hard disk, and when a request is received from the user PC 4 or the client PC 7A, 7B or 7C, the live casting server 150 sends the Web page corresponding to the request to the user PC 4 or the client PC 7A, 7B or 7C to allow it to bee seen.

The reservation database 151 stores the reservation situation about the live distribution reserved in the above-described live reservation mode and billing information generated by the reservation.

In this case, the reservation database 151 stores a reservation table (not shown) showing the correspondence between each reservation item and a reservation time zone, channel to be used, reservation contents including a transmission zone (bit per second (bps)), etc., user ID to identify the user, billing flag information indicating whether a reservation is established and billing is possible at that point in time or not, and reservation ID to be used for authentication when the reservation is accomplished.

The various kinds of information in this reservation table are recorded during reservation processing, etc. by the live casting server 150, which will be described later and referenced during authentication processing by the database server 155, which will be described later.

The user database 152 is intended to store user information on the registered users (content providers who supply content through the user PCs 4 and client users who receive a stream distribution of content through the client PCs 7A, 7B and 7C) having the right to use a personal casting service, and stores, for each registered user, the name, user ID, password, e-mail address, address, telephone number (cellular phone number and facsimile number), credit card number and expiration date of the credit card for billing, etc.

The user information stored in the user database 152 is recorded during member registration processing by the live casting server 150, which will be described later and referenced during a live reservation by the live casting server 150.

The NTP server 153 is intended to control time information on the service provider side such as the server use reservation control center 5 and streaming server 8 all together. Therefore, the live casting server 150 and streaming server 8 are intended to acquire time information from the NTP server 153 and control the start time and end time of a live distribution based on the acquired time information.

This takes into account the provision of a service like a live distribution, which should be operated under precise time control, and unifies reference times on the service provider side so that the server use reservation control center 5 and streaming server 8 on the service provider side operate in a precisely synchronized state based on the same reference time.

Furthermore, there can be a time difference between the time of the user PC 4 and the reference time on the service provider side, and if this time difference is not recognized by the user PC 4, a difference may be generated between the start time and end time of a live distribution specified by the service provider and the start time and end time of a live distribution recognized by the user PC 4.

Therefore, the live casting server 150 calculates the above-described time difference based on the reference time acquired from the NTP server 153 and notifies the usr PC 4 of this time difference when the user PC 4 makes a live reservation.

When the user PC 4 or another illegal user PC sends a connection request for using the streaming server 8 to an access port of the dedicated server connection network 6, the database server 155 carries out authentication processing as to whether the accessing PC is the user PC 4 who owns a legitimate reservation or not based on the request from the access server (not shown) of the dedicated server connection network 6.

In this case, if the database server 155 authenticates in the above-described authentication processing that the user is the legitimate user PC 4, a communication/connection is established between the streaming server 8 and user PC 4 and the user PC 4 sends a request for stream distribution processing to the streaming server 8.

In this case, the streaming server 8 requests the database server 155 to perform authentication processing to authenticate whether the user PC 4 who is the sender of the distribution request owns a legitimate live reservation or not.

Also when a request from the streaming server 8 is received, the database server 155 performs authentication processing as to whether the user is the user PC 4 who owns a legitimate live reservation or not. By the way, the database server 155 performs authentication processing by referencing the reservation database 151, and this authentication processing will be described in detail later.

(1-4) Configuration of Streaming Server

The streaming server 8 receives the moving image data of content sent through a transmission path made up of a connection through a dedicated line from the user PC 4 who owns the above-described legitimate live reservation (when connected through the dedicated server connection network 6) or the Internet connection (when connected via the public network 3A and Internet 2), and distributes this by means of streams to the client PCs 7A, 7B and 7C who sent a distribution request over the Internet 2.

In this case, the streaming server 8 has a plurality of channel configurations corresponding to the respective distribution environments of the connection through the dedicated line and Internet connection, and can thereby execute live distribution processing by the plurality of content providers simultaneously even when a plurality of content providers get access as live distributors at the same time zone.

The streaming server 8 actually presets the number of users to whom distribution is possible, transmission band (for example, 20 kbps, 34 kbps, 45 kbps, 80 kbps, 220 kbps, etc.) and fee, etc. which are different for each channel and the content provider who carries out a live distribution via the streaming server 8 arbitrarily selects a distribution channel on which to make a live reservation.

Furthermore, the streaming server 8 is intended to perform stream distribution processing on the moving image data of content sent from the content provider of the user PC 4 as described above, and reads commercial content from the hard disk, etc. and carries out distribution processing of the commercial content in unreserved time zone or a time zone between content.

Furthermore, the streaming server 8 is intended to control the distribution reservation time zone and limit the number of the client PCs 7A, 7B and 7C as distribution destination according to the reservation contents of the live reservation permitted for the user PC 4 by the server use reservation control center 5.

(1-5) Communication/Connection Between Streaming Server and User PC to Carry Out a Live Distribution When carrying out a live distribution, the content distribution system 1 must connect the user PC 4 to the streaming server 8 (FIG. 1) through connections over a dedicated line or the Internet and secure the transmission path for content to be sent from the user PC 4 to the streaming server 8.

At this time, when the user PC 4 itself has a distribution environment connectable not only to the telephone network 3A but also to the cable TV network 3B or ADSL network 3C, the user PC 4 can select any one of these lines and send content to the streaming server 8 through the transmission path of either connection through the dedicated line or the Internet.

By the way, the dedicated server connection network 6 is a dedicated network provided to carry out a live distribution in personal casting services provided by the content distribution system 1.

Thus, the content distribution system 1 is designed to carry out content distribution using both the dedicated line connection and Internet connection according to the distribution environment of the user PC 4 and control so that the content provider selects an optimal distribution channel when making a live reservation according to the distribution environment of the user PC 4.

On the other hand, the access server of the dedicated server connection network 6 requests the database server 155 (FIG. 11) to perform authentication processing for a normal user who sends a connection request to authenticate whether the PC of the user who has sent the connection request owns a legitimate live reservation or not.

Then, when the access server of the dedicated server connection network 6 decides that the authentication processing by the database server 155 proves that the user does not own a legitimate live reservation, the access server immediately cuts off the call from the PC which has sent the connection request.

However, though the PC of the illegitimate user cannot use the line of the dedicated server connection network 6, one line remains busy during authentication processing.

Thus, when the maximum number of users to whom connections are permitted is the same number of prepared lines, if illegal users send multiple calls to the access port of the dedicated server connection network 6 simultaneously for the purpose of interrupting the personal casting service or with other intentions, this will prevent the PC 4 of a user who owns a legitimate live reservation from accessing.

When realizing a personal casting service, the content distribution system 1 is designed to allow the user PC 4 to connect to the streaming server 8 a predetermined time before the live distribution start time based on the reservation contents of the live reservation, thereby complete authentication processing and connection processing for the user PC 4 before the live distribution start time so that the live distribution can start through the user PC 4 when the time to start the live distribution comes.

However, in this case, too, if, for example, time zones of live reservation are continuous between different users, a connection by a content provider who reserved an earlier time zone and is currently distributing content overlaps with another connection after a predetermined time before the live distribution start time by another content provider who reserved a later time zone, in which case the number of lines corresponding to the maximum number of users to whom content can be distributed is no longer sufficient.

Therefore, the streaming server 8 sets the number of lines for connections to the streaming server 8 to about two or more times the maximum number of users who are allowed to connect to the streaming server 8 in the same time zone (for example, if the maximum number of users to whom connections are allowed is 10, the number of lines is set to 20), and can thereby reduce the possibility of illegal users interfering with supplies of services and sufficiently handle the case where an earlier time zone overlaps with a later time zone.

Furthermore, the dedicated server connection network 6 for connecting to the streaming server 8 can provide not only one access port for a network by a single carrier (for example, public telephone network) but also access ports accessible from networks of a plurality of carriers.

In this case, the user PC 4 selects a carrier to which it is connected, sends a call to the access port corresponding to the network of the carrier and establishes a communication/connection with the streaming server 8 through the dedicated server connection network 6.

(1-6) Configuration of Client PC

As described above, the moving image data of the content sent in real time from the user PC 4 to the streaming server 8 is live-distributed via the streaming server 8 and streamdistributed to the client PCs 7A, 7B and 7C that sent distribution requests via the Internet 2.

In this case, during a stream distribution from the streaming server 8, the client PCs 7A, 7B and 7C can reproduce the content in real time through a predetermined application program (for example, "Real player" (Real Networks Corporation) and "Windows Media Player" (Microsoft Corporation), etc.).

(2) Operation of Content Distribution System

Then, various types of processing carried out by the content distribution system 1 to realize the live casting service will be explained one by one.

(2-1) Member Registration

First, when the content provider of the user PC 4 performs a live distribution using the personal casting service, the content provider needs to get registered as a member in the live casting server 150 of the server use reservation control center in order to acquire the right to perform a live distribution of the personal casting service.

Figure 12:
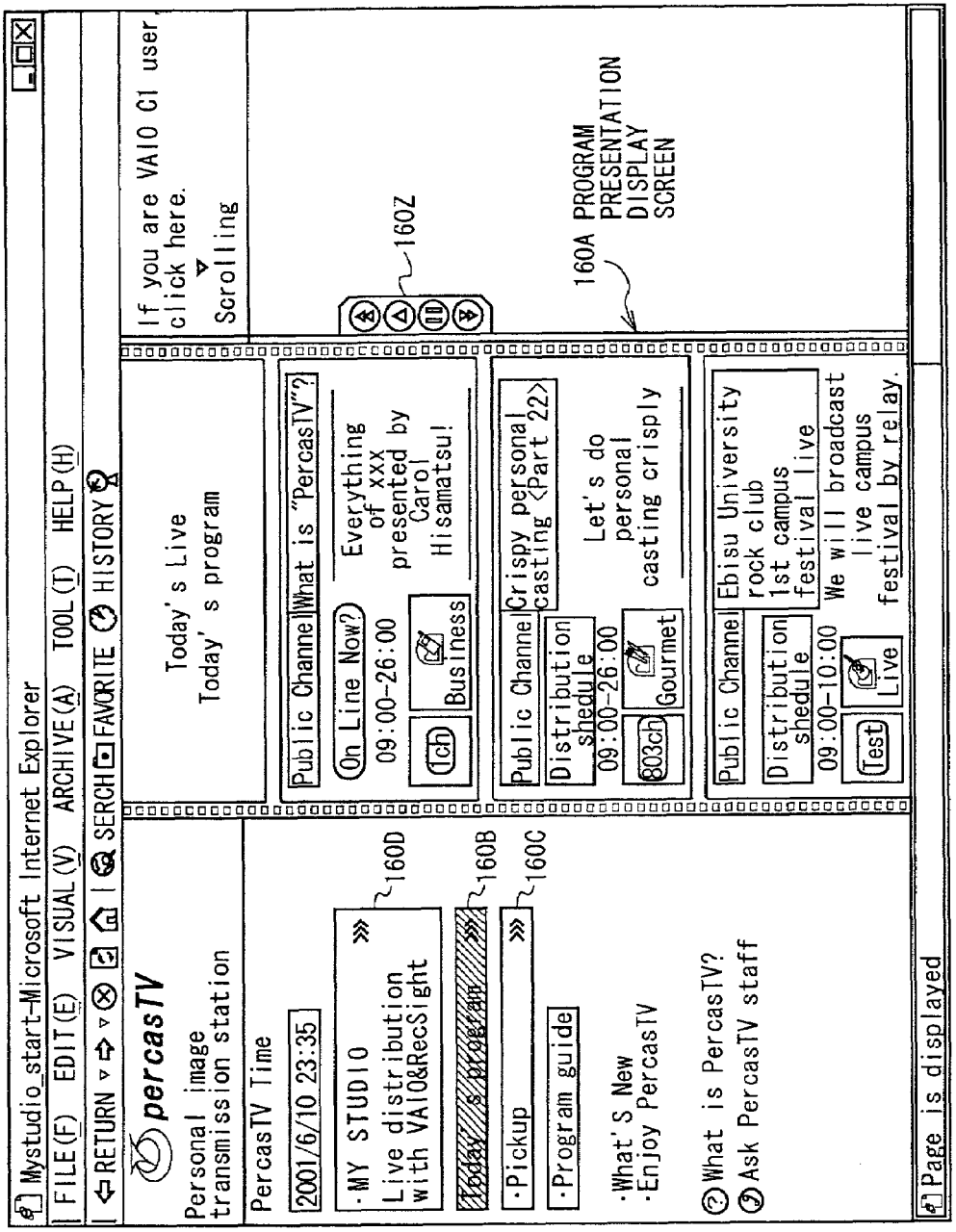
FIG. 12 is a schematic diagram showing a personal casting service top page screen.

Actually when the user PC 4 sends a browsing request to the live casting server 150 based on the URL directly input by the content provider in the URL display field 84 of the Web confirmation mode screen 52 (FIGS. 8A and 8B), the user PC 4 shows a personal casting service top page screen 160 received from the live casting server 150 on the browser display screen 80 as shown in FIG. 12.

When sending a request for browsing the personal casting service top page screen 160 to the live casting server 150, the content provider can jump to the personal casting service top page screen 160 not only by entering the above-described URL but also by clicking on a link button on another homepage.

This personal casting service top page screen 160 is provided with a program presentation display screen 160A that reminds a film roll almost in the center and this program presentation display screen 160A moves cyclically in the vertical direction at a predetermined speed.

The contents of this program presentation display screen 160A correspond by default to a case where a "Today's program" button 160B is selected and shows a title "Today's Live" and information on programs (content) to be distributed today as one of frames of a cyclically moving film.

From the personal casting service top page screen 160, it is possible to change the moving direction of or stop the movement of the program presentation display screen 160A by operating the operation button 160Z, which helps the client user select information of a desired program and see it while the screen stops.

Furthermore, a "MY STUDIO" button 160D is provided on the personal casting service top page screen 160 and clicking on this "MY STUDIO" button 160D causes the live casting server 150 to send a Web page hyper-linked to the "MY STUDIO" button 160D to the user PC 4.

Figure 13:
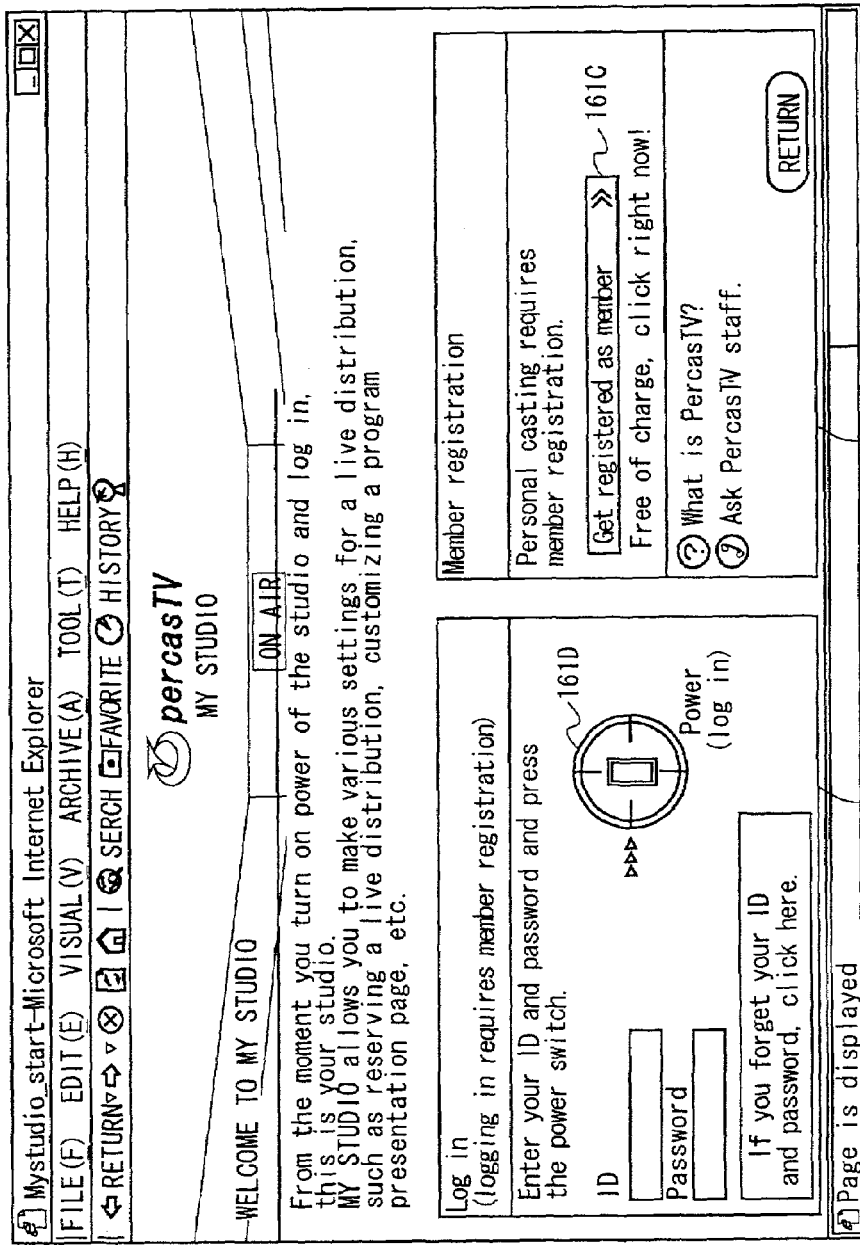
FIG. 13 is a schematic view showing a MY STUDIO screen.

The CPU 10 of the user PC 4 shows a MY STUDIO screen 161 as shown in FIG. 13 based on the Web page received from the live casting server 150.

This MY STUDIO screen 161 is provided with a login display field 161A that urges an already registered member to perform login processing and a member registration field 161B for an unregistered user, thus urging a registered member to enter a user ID and password through the login display field 161A and an unregistered user to click on the "Register as member" button 161C of the member registration field 161B to get registered as a member through the next member registration screen (not shown).

When a click is made on the "Register as member" button 161C of the member registration field 161B on the MY STUDIO screen 161, the CPU 10 of the user PC 4 receives the next Web page from the live casting server 150 and shows a member registration input screen 161C as shown in FIG. 14 based on the Web page.

This member registration input screen 161C is provided with items to be answered for member registration and input fields for the respective items.

Here, this personal casting service provides two types of member registration, one for general members who only use the functions of the above-described client PCs 7A, 7B and 7C, that is, receiving a live distribution from the streaming server 8 and the other for premium members who not only use the above-described service but also become live providers to use a personal casting service. The member registration input screen 161C is provided with an input field 210 common to general and premium members and an input field 211 exclusively for premium members.

Client users who only get registered as general members through the client PCs 7A, 7B and 7C fill in the input field 210 on this member registration input screen 161C.

Moreover, the member registration input screen 161C is further provided with a cancel button 212 for canceling the input contents and a registration button 213 instructing that the input contents should be registered and when a click is made on the registration button 213, the client PCs 7A, 7B and 7C send the input contents as the registration information to the live casting server 150 over the Internet 2.

On the other hand, to get registered as a premium member, the content provider checks the "Register as premium member" checkbox and fills in the input field 210 and input field 211.

When the content provider completes filling in the items in the input field 210 and input field 211 and clicks on the registration button 213, the CPU 10 of the user PC 4 creates a registration information file with the same content as the member registration input screen 167, sends this to the live casting server 150 over the Internet 2, and at the same time records and stores the registration information file in the hard disk 13.

After receiving the registration information file sent from the user PC 4 over the Internet 2, the live casting server 150 checks the content of the received registration information file and decides whether or not to permit the registration.

In this case, if the checking result shows that some necessary items are not complete, the live casting server 150 informs it to the user PC 4 and urges the user to reenter the information.

Furthermore, the live casting server 150 gets access to a credit check server of a credit company over the Internet 2 to check if the credit card in the registration information file is valid or not and only permits the registration when the credit card is proven to be valid.

When permitting the registration, the live casting server 150 records information of all items recorded in the registration information file in the user database 152 to perform member registration processing, and then informs the user PC 4 over the Internet 2 that the member registration processing has been completed, which completes all the registration procedure.

(2-2) Reservation Registration of Distribution Reservation

When the above-described member registration processing is completed, the content provider of the user PC 4 then performs reservation registration processing in the live casting server 150 of the server use reservation control center 5 for reserving a time zone to realize a stream distribution via the streaming server 8.

Figure 15:
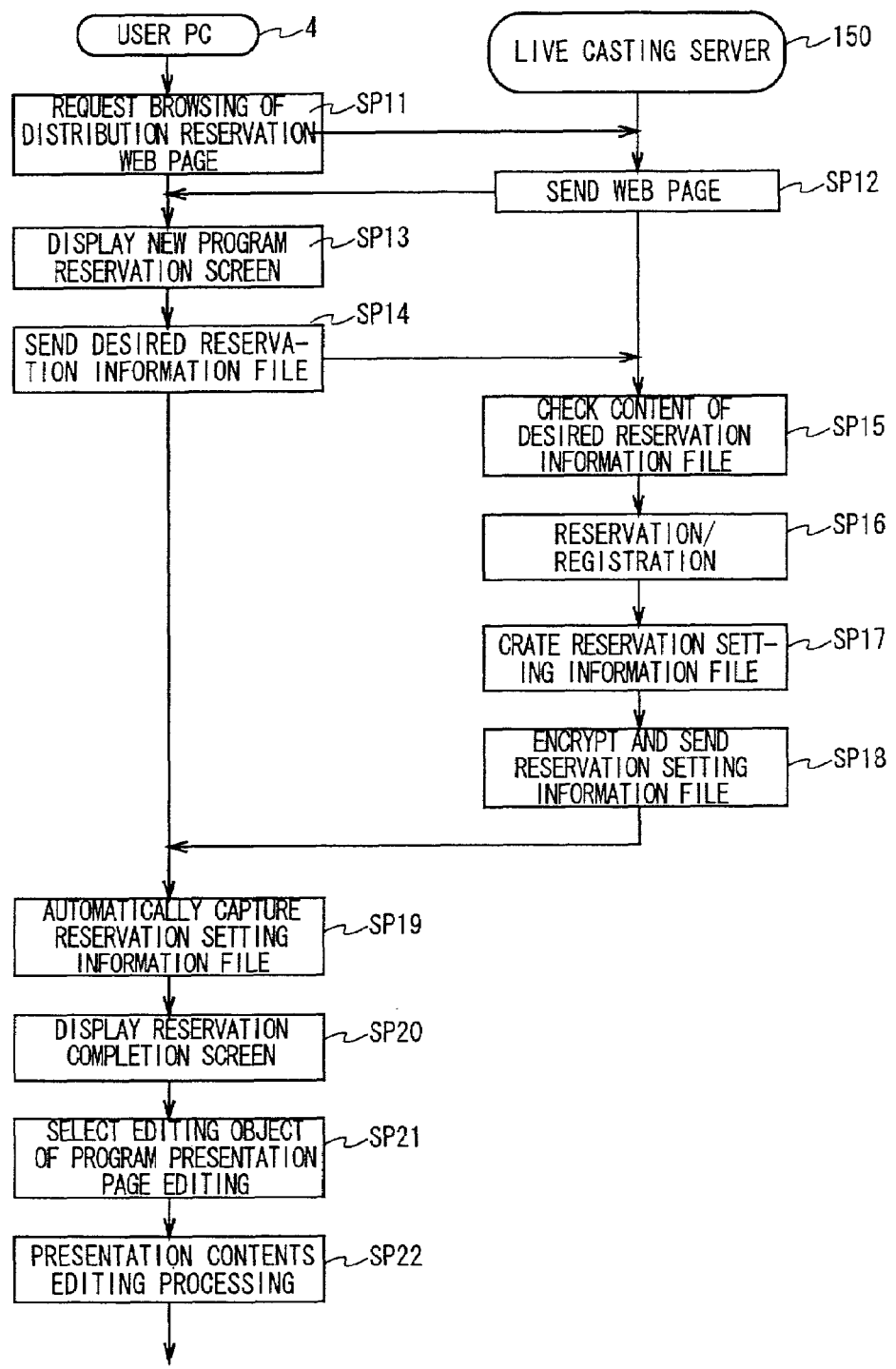
FIG. 15 is a flow chart showing a reservation/registration processing sequence.
Figure 16:
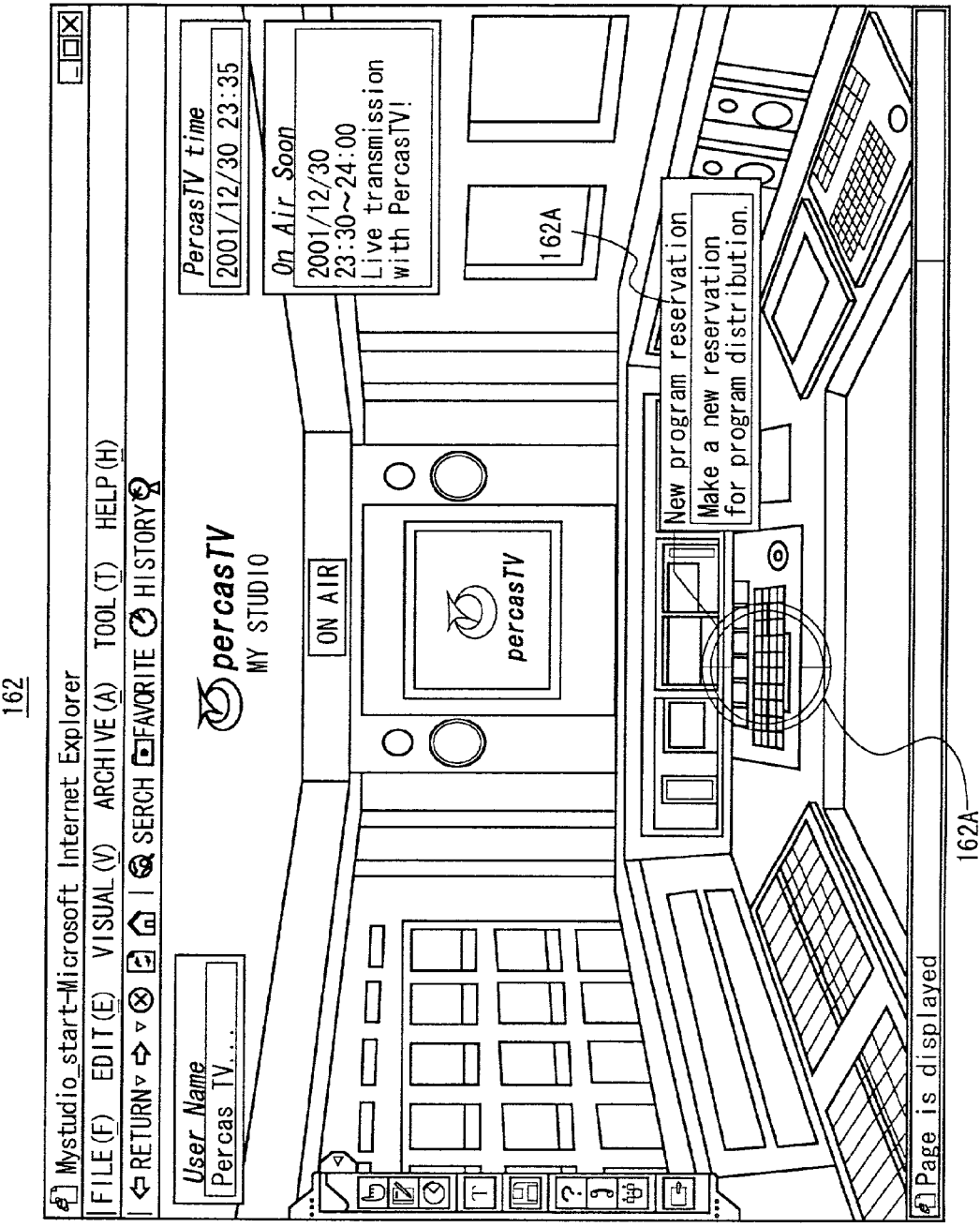
FIG. 16 is a schematic view showing a MY STUDIO start screen.

Actually, as shown in FIG. 15, after the member registration processing is completed, when the content provider who has become a registered member enters a user ID and password in the login display field 161A and clicks on the power switch button 161D on the MY STUDIO screen 161 (FIG. 13), in step SP11, the CPU 10 of the user PC 4 performs login processing to the live casting server 150 of the server use reservation control center 5 and displays a MY STUDIO start screen 162 as shown in FIG. 16 based on the next Web page received from the live casting server 150.

The MY STUDIO start screen 162 is constructed of an image reminding a studio of a broadcasting station and a new program reservation button (area indicated by double circles in this case) 162A to make a reservation for a new program is provided in almost the central area and when a click is made on the new program reservation button 162A, a procedure related to the next new program reservation starts.

Figure 17:
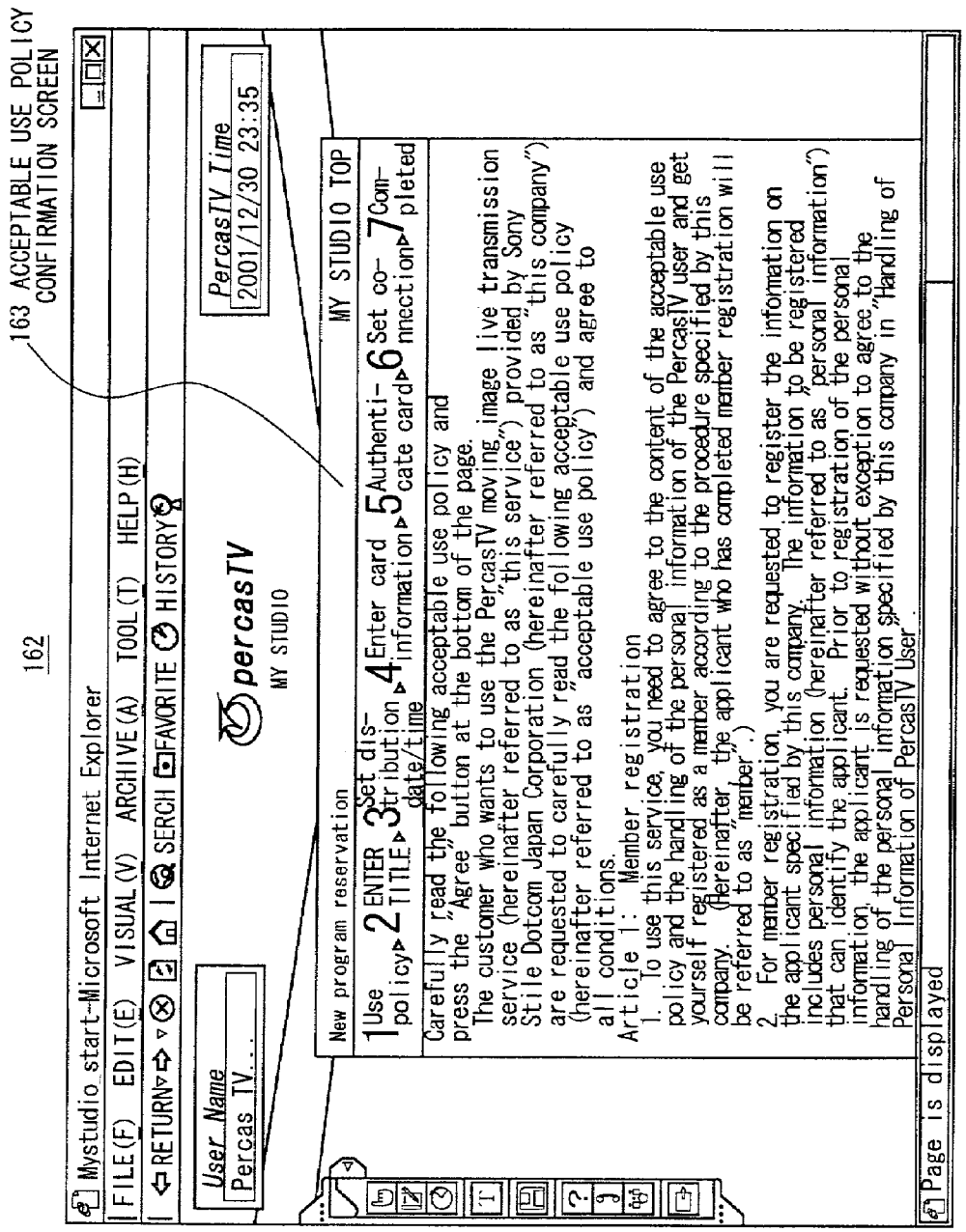
FIG. 17 is a schematic diagram showing an acceptable use policy confirmation screen.

When a click is made on the new program reservation button 162A on the MY STUDIO start screen 162, the CPU 10 of the user PC 4 receives the next Web page from the live casting server 150 and overlays an acceptable use policy confirmation screen 163 as shown in FIG. 17 on the MY STUDIO start screen 162 based on the above-described Web page.

This acceptable use policy confirmation screen 163 describes an acceptable use policy to use a personal casting service and various regulations on member registration and when the user confirms these contents and clicks on the area described as "Agree" (not shown), the CPU 10 of the user PC 4 requests the live casting server 150 to browse the distribution reservation Web page and moves on to the next step SP12.

In step SP12, when the user PC 4 sends a request for browsing the distribution reservation Web page, the live casting server 150 sends the distribution reservation Web page to the user PC 4 over the Internet 2 and moves on to the next step SP13.

Figure 18:
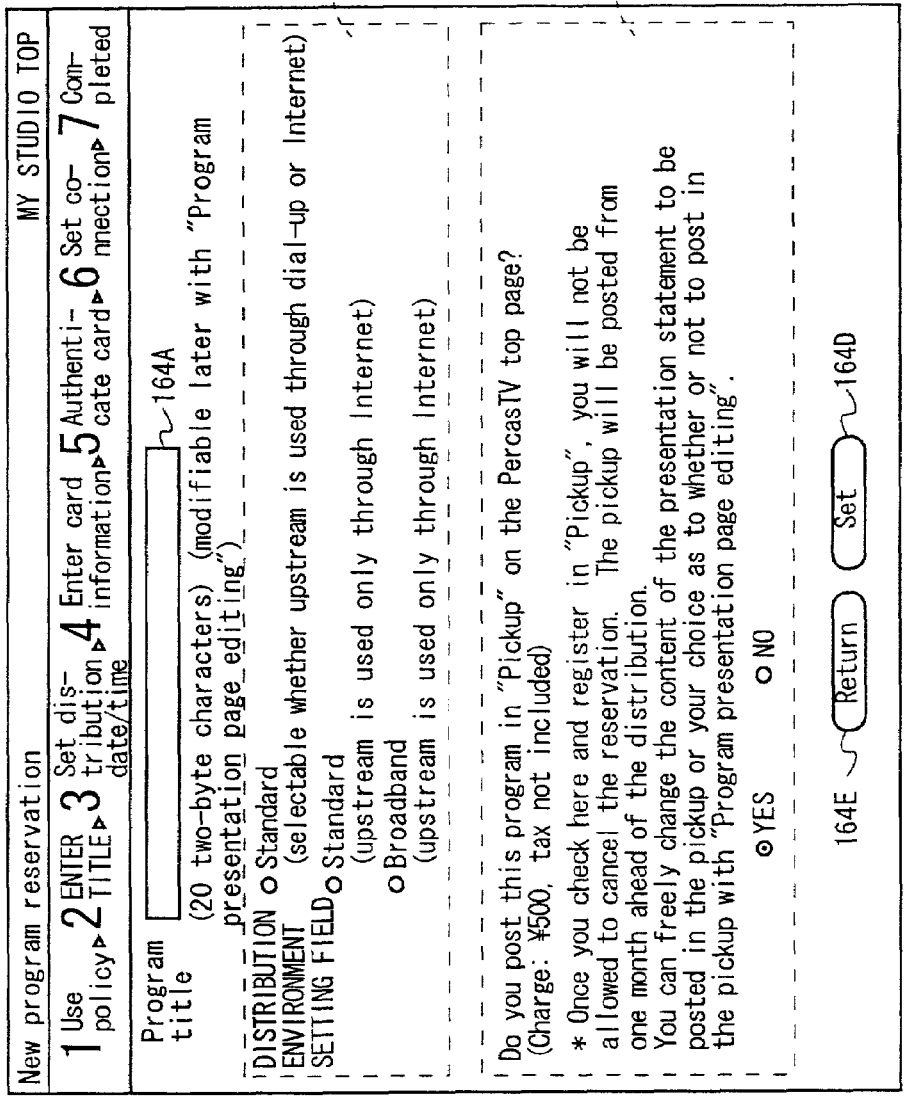
FIG. 18 is a schematic diagram showing a new program reservation screen.

In step SP13, the user PC 4 receives the distribution reservation Web page from the live casting server 150 and overlays a new program reservation screen 164 as shown in FIG. 18 based on the distribution reservation Web page instead of the acceptable use policy confirmation screen 163, on the MY STUDIO start screen 162.

This new program reservation screen 164 is provided with a program title input field 164A for the content provider to enter the program title of the content to be distributed, a distribution environment setting field 164B and a program notification setting field 164C to select whether or not to post the program presentation information of the content on the program presentation display screen 160A of the personal casting service top page screen 160.

The same program title entered in the program title input field 164A appears on the program presentation display screen 160A of the personal casting service top page screen 160, but the program title can also be changed later depending on the intention of the content provider on the program presentation page editing screen (will be described later).

Furthermore, the distribution environment setting field 164B is provided with three types of check field described as "Standard (selectable whether upstream is used via dial-up or Internet)", "Standard (upstream is used only via the Internet)" and "Broadband (upstream is used only via the Internet)" and a distribution environment applicable to the user PC 4 is selectable from these options.

Furthermore, the program notification setting field 164C is provided with two types of check fields described as "Yes" and "No" and when the "Yes" check field is checked and a click is made on the "Pickup" button 160C on the personal casting service top page screen 160, the program presentation information including the program title, etc. will be posted on the program presentation display screen 160A from one month before the date of the content distribution until the date of the distribution.

However, even if the "No" check field is checked, if a click is made on the "Today's program" button 160B on the live casting service top page screen 160 (FIG. 12), the program presentation information on the content on the date of the distribution will be posted on the program presentation display screen 160A.

If the user clicks on the "Set" button 164D after entering the program title, selecting the distribution environment and selecting the program notification in the new program reservation screen 164, the CPU 10 of the user PC 4 overlays a broadcasting date/time setting screen 165 as shown in FIG. 19 based on the next Web page received from the live casting server 150 instead of the new program reservation screen 164, on the MY STUDIO start screen 162.

By the way, if a click is made on the "Return" button 164E on the new program reservation screen 164, the CPU 10 of the user PC 4 returns to the acceptable use policy confirmation screen 163, the screen one before, instead of moving on to a broadcasting date/time setting screen 165.

The broadcasting date/time setting screen 165 allows the user to arbitrarily select a desired date to make a distribution reservation from a timetable shown in the form of a calendar. When a click is made on a desired date, the clicked date is automatically set in a distribution date input field 165A.

Furthermore, on the broadcasting date/time setting screen 165, after setting the distribution date in the distribution date input field 165A, filling in the start time input field 165B, distribution time input field 165C and distribution channel input field 165D and then clicking on the "Set" button 165E, the CPU 10 of the user PC 4 receives the next Web page from the live casting server 150 and overlays a payment screen 166 as shown in FIG. 20 instead of the broadcasting date/time setting screen 165, on the MY STUDIO start screen 162 based on the Web page.

The payment screen 166 shows "Reservation date", "Reservation time", "Channel", "Duration" and "Fee" in a reservation contents display field 166A corresponding to the "Title" ("CONGRATULATION" in this case) entered in the program title input field 164A of the new program reservation screen 164 and the fee display field 166B shows a reservation fee, a pickup registration fee occurred when a program notification is selected, a total amount including a predetermined discounted fee, etc., which allows the content provider to confirm the reservation time zone and contents of the fee.

Furthermore, the payment screen 166 allows the content provider to enter his/her credit card information in a credit card information input field 166C and then select clicking on a "Reserve" button 166D or "Return" button 166E.

In step SP14, when a click is made on the "Set" button 166D of the payment screen 166, the CPU 10 of the user PC 4 creates a desired reservation information file based on the various kinds of information set on the new program reservation screen 164 (FIG. 18), the broadcasting date/time setting screen 165 (FIG. 19) and the payment screen 166 (FIG. 20), sends the desired reservation information file to the live casting server 150 over the Internet 2 and then moves on to the next step SP15.

At this time, as shown in FIG. 21, the CPU 10 of the user PC 4 displays a payment in progress screen 167 instead of the payment screen 166 and notifies the content provider that the live casting server 150 is authenticating the information of the credit card of the content provider.

In step SP15, the live casting server 150 checks the contents of the desired reservation information file received from the user PC 4, decides whether or not to permit the reservation and moves on to the next step SP16.

Actually, the live casting server 150 makes a confirmation check to see if the contents of the desired reservation information file are complete and the desired reservation time zone for the desired distribution channel is free or not, and further checks whether the live reservation made by the content provider exceeds the set number of frames.

More specifically, in this live casting service, the maximum number of frames that can be reserved for one month (for example, 10 minutes per frame) is set for each content provider who made a reservation and registration to carry out a live distribution.

Therefore, the live casting server 150 decides whether the number of frames of the live reservation that this content provider has already made for one month exceeds the set number of frames or not as a check to see if this live reservation can be permitted or not and if it exceeds the set number of frames, the live casting server 150 does not permit the live reservation.

On the other hand, when the number of frames of the live reservation that this content provider has already made for one month is less than the set number of frames, the live casting server 150 decides that the check result has no problem and if other check results have no problems either, the live casting server 150 permits the live reservation.

Since the live casting server 150 checks the number of reserved frames of the content provider for one month in this way, the user database 152 stores the reservation situation of live reservations for at least last one month for each content provider who is registered as a premium member.

In step SP16, when permitting a live reservation, the live casting server 150 creates a reservation ID used only for authentication when the reservation is accomplished, records information on the reservation contents including the reservation time zone, distribution channel, transmission band (bit per second (bps)) and mail addresses of a friend list, user ID to identify the content provider and reservation ID in the reservation database 151 (FIG. 15) based on the contents of the desired reservation information file and moves on to the next step SP17.

At this time, if a setting that the presentation information of the content would be posted on the program presentation display screen 160A of the live casting service top page screen 160 has been made on the new program reservation screen 164, the live casting server 150 rewrites the billing flag information of the user database 152 as "Acceptable" and proceeds with billing processing.

In step SP17, the live casting server 150 references the reservation database 151 and user database 152, creates, for example, a reservation setting information file 184 as shown in FIG. 22 with the same contents as the reserved/registered ones and moves on to the next step SP18.

At this time, the CPU 10 of the user PC 4 shows an acquisition setting screen 168 as shown in FIG. 23 to automatically set the reservation setting information file 184 based on the next Web page received from the live casting server 150 instead of the payment screen 167.

On this acquisition setting screen 168, a reservation contents display field 168A corresponding to "Title" ("CON- GRATULATION" in this case) shows "distribution date", "start time-end time", "channel" and "audience password" for the purpose of confirming the contents of the reservation setting information file 184. The password shown in "audience password" here refers to the distribution request password in the reservation setting information file 184.

After the reservation contents display field 168A is confirmed on the acquisition setting screen 168, if a click is made on an auto setting button 168B, the CPU 10 of the user PC 4 sends a request for acquisition of the reservation setting information file 184 to the live casting server 150.

The acquisition setting screen 168 is provided with a "Reservation file download" button 168C so that even if the basic program of the user PC 4 can not automatically take in the reservation setting information file 184, the file is converted to a format that can be taken in by the live casting server 150 and then downloaded.

In step SP18, the live casting server 150 applies encryption according to an encryption system such as DES (Data Encryption Standard) to the reservation setting information file 184 in response to the acquisition request from the user PC 4, to convert this to an encrypted file, sends it to the user PC 4 and moves on to the next step SP19.

In step SP19, the CPU 10 of the user PC 4 receives the encrypted file sent from the live casting server 150, decrypts it using a program such as "ActiveX" to decode the reservation setting information file 184, automatically incorporates the reservation setting information file 184 in a predetermined storage area of the hard disk 13 according to a command included in the reservation setting information file 184 and moves on to the next step SP20.

In step SP20, the moment the automatic loading of the reservation setting information file 184 is completed, the CPU 10 of the user PC 4 shows a reservation completion screen 169 as shown in FIG. 24 instead of the acquisition setting screen 168.

The reservation completion screen 169 shows characters "Reservation completed" and shows a reservation contents notification field 169A with the same contents as those of the reservation contents notification field 168A of the acquisition setting screen 168 in which characters "Only the reservation of a time frame has been complete so far, . . . " appear, and urges the content provider to move on to the next program presentation page editing processing to direct the program.

That is, the reservation registration processing by the CPU 10 of the user PC 4 is completed in this stage anyway and when the start time on the reserved date comes, a stream distribution start via the streaming server 8.

In this case, with only the time frame reservation/registration processing, the program presentation information of the content will remain blank. Although this is incomplete reservation/registration processing, this can save time and trouble for a content provider who needs not to post the program presentation information or a content provider who has not enough time after reservation/registration until the start of a live distribution and provides a merit of shortening the time for reservation/registration processing.

On this reservation completion screen 169, if a click is made on "To program presentation page editing" button 169B, the CPU 10 of the user PC 4 receives the next Web page from the live casting server 150 and shows an editing object selection screen 170 as shown in FIG. 25 based on the Web page instead of the reservation completion screen 169.

The editing object selection screen 170 enumerates programs indicating a plurality of content reserved/registered by the content provider so that the content provider can click on the reservation ID of a program to be edited from among these programs.

In step SP21, when the content provider clicks on the reservation ID of the program to be edited from the editing object selection screen 170, the CPU 10 of the user PC 4 sends the reservation ID of the clicked program to the live casting server 150 over the Internet 2.

Upon reception of the reservation ID of the program to be edited from the user PC 4, the live casting server 150 sends a Web page of the program presentation page editing screen about the program corresponding to the reservation ID to the user PC 4.

In step SP22, the CPU 10 of the user PC 4 shows a program presentation page editing screen 171 as shown in FIG. 26 and FIG. 27 based on the Web page received from the live casting server 150, instead of the editing object selection screen 170, and carries out the editing processing of the program presentation information.

This program presentation page editing screen 171 displays a reservation contents display field 171A including "Reservation ID", "Channel" and "Reservation time" at the top and a title input field 171B for entering a program title is provided below the reservation contents display field 171A.

The reason that the title input field 171B is provided for the program presentation page editing screen 171 is that a possibility of changing the program title entered when reservation/registration is performed for the first time is considered, and in that case, a newly entered program title is posted together with "Reservation time" of the reservation contents display field 171A on the program presentation display screen 160A of the live casting service top page screen 160.

Below the title input field 171B are sub-title input field 171C, genre input field 171D, program summary input field 171E, program detail input field 171F and audience password input field 171G, and these fields can be filled in by the content provider arbitrarily according to the content to be distributed.

Below the audience password input field 171G is a sender's portrait number setting field 171H and when a click is made on "See design" button, a plurality of portraits corresponding to the portrait numbers to be selected as the sender's portrait is displayed.

Thus, by selecting the portrait number of a desired portrait from the plurality of portraits and entering the portrait number in a portrait number setting field 171H, the content provider who is the sender can make a setting to post the portrait with the portrait number on the program presentation display screen 160A of the personal casting service top page screen 160.

Below the portrait number setting field 171H is a production staff input field 171I so that various kinds of information on the production staff members who participated in the production of the content can be entered.

Below the production staff input field 171I is a replay button display time delay setting field 171J so that in order to make a rehearsal check before actually starting a stream distribution of the content by actually operating the user PC 4 and streaming server 8, etc., the content provider makes a setting to delay timing for displaying the replay button on the client PCs 7A, 7B and 7C by the time required for the rehearsal check.

In this case, the distribution start time delayed by the time required for the rehearsal check is displayed on the client PCs 7A, 7B and 7C so as to prevent the rehearsal images from being distributed to the client users.

Below the display time delay setting field 171J is a message acceptance setting field 171K to set whether or not the content provider accepts messages on the content via e-mails from client users who saw the program presentation display screen 160A of the personal casting service top page screen 160 and this setting is easily done by checking the "Accept" or "Not accept" check field.

If the content provider has made the setting to accept messages via e-mails from client users, it is possible for client users who saw the program presentation display screen 160A of the personal casting service top page screen 160 to inquire the content provider about the place where the live of the content takes place via e-mails, etc. and it is possible to make the information on the content widespread among an indefinite number of client users.

Below the message acceptance setting field 171K are homepage setting fields 171L and 171M to enter the name and URL of a recommended homepage related to the program and also a pickup posting setting field 171N to ask whether or not to post the URL of the homepage on the program presentation display screen 160A of the personal casting service top page screen 160.

Below the pickup posting setting field 171N are a pickup presentation statement setting field 171P to enter an introductory statement to be posted on the program presentation display screen 160A of the personal casting service top page screen 160, a design setting field 171Q to select designs of the replay display screen and presentation page screen, a question item setting field 171R to enter questions about the client user on the replay display screen and answer setting fields 171S, 171T and 171U to set three types of answers to the question.

Finally, a program presentation page preview button 171V is a button for the content provider to see the program presentation page screen as a preview and a replay page preview button 171W is a button for the content provider to see the replay display screen as a preview.

After the editing of the program presentation page is completed on this program presentation page editing screen 171, if a click is made on an editing completion button 171X, the CPU 10 of the user PC 4 sends the edition result data edited on this program presentation page editing screen 171 to the live casting server 150 over the Internet 2 and completes the editing processing.

To request for editing processing of another program, the content provider only needs to click on a "Return to reservation list" button 171Y and at this time the CPU 10 of the user PC 4 redisplays the editing object selection screen 170 (FIG. 25) to allow the content provider to select another program to be edited.

The live casting server 150 receives the edition result data, adds the edition result data to the reservation/registration content corresponding to reservation ID, updates the reservation/registration content and sends a Web page with this information to the user PC 4.

This allows the CPU 10 of the user PC 4 to display an editing update notification screen 172 as shown in FIG. 28 based on the Web page so that the content provider recognizes that the editing processing of the program presentation information on the program has completed.

(2-3) Live Distribution

After the above-described live reservation registration processing is completed, when the live distribution start time based on the live reservation comes, the user PC 4 connects to the streaming server 8 by a connection via a dedicated line over the dedicated server connection network 6 or cable TV network 3B or by the Internet connection over the ADSL network 3C, and carries out a stream distribution of the content to the client PCs 7A, 7B and 7C.

Figure 29:
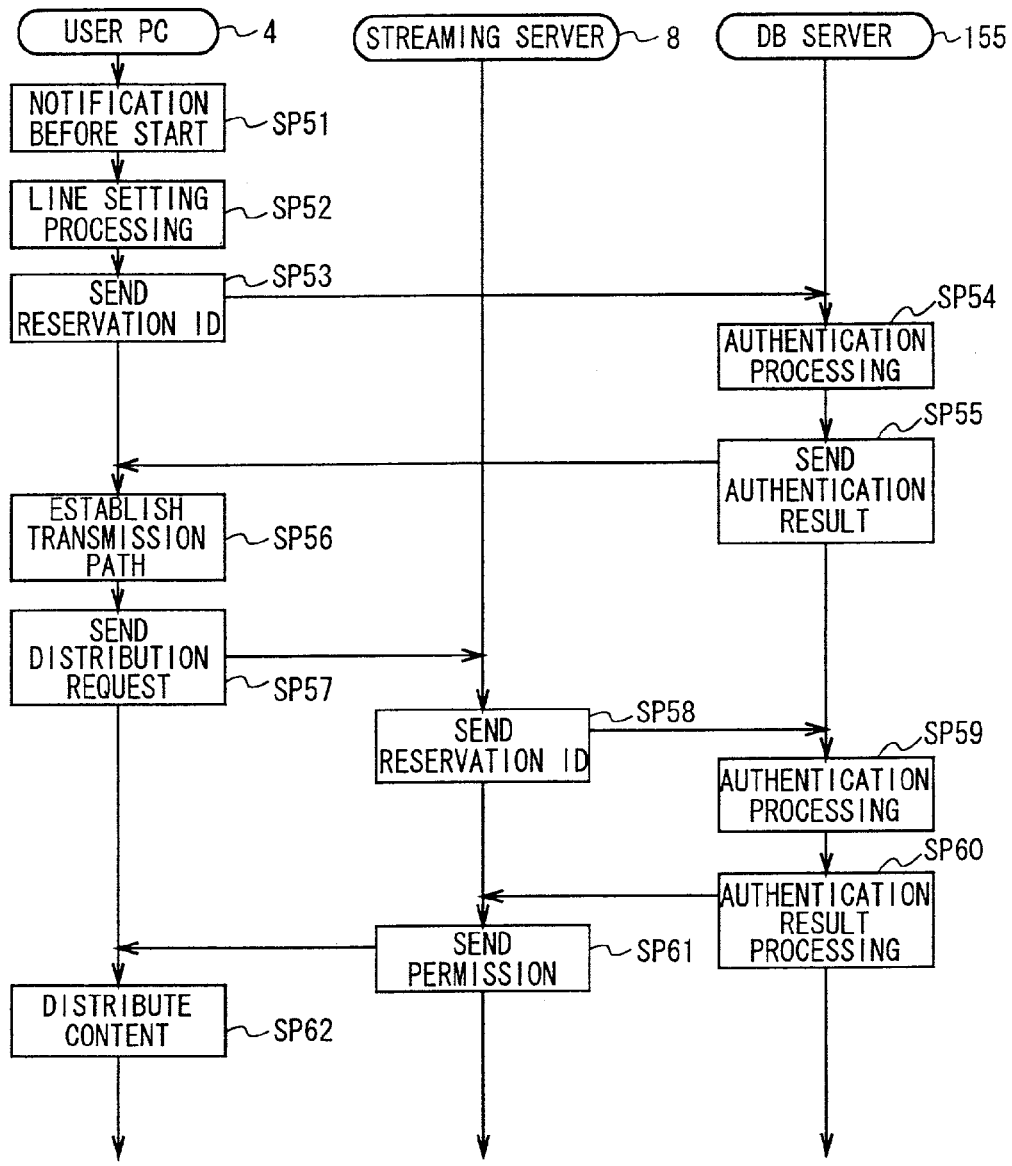
FIG. 29 is a flow chart showing a content transmission processing sequence.

To carry out a live distribution, a content transmission processing sequence by the user PC 4, streaming server 8 and database server 155 when the user PC 4 sends content to the streaming server 8 will be explained using FIG. 29.

Here, when a live distribution is carried out, since the user PC 4 is allowed to connect to the streaming server 8 by a connection via a dedicated line or by the Internet connection from 5 minutes before the live distribution start time, processing to establish a communication/connection between the user PC 4 and streaming server 8 will start after 5 minutes before the start of a live distribution.

Therefore, the content provider needs to have prepared for a live distribution of the content by 5 minutes before the start time of a live distribution.

By the way, preparations for a distribution of content include determination of locations of picture taking using the digital video camera 19 (FIG. 2) of the user PC 4 and processing of setting effect items of which the special effects are to be applied based on the concept of the content (FIG. 12, FIG. 13 and FIG. 14).

Furthermore, the user PC 4 of this embodiment stores a notification program about the live distribution in the hard disk 13 and when it is a predetermined time (for example, 10 minutes) before the start time of the live distribution, a message "Live distribution will start soon" appears to notify the content provider according to the notification program.

That is, in step SP51, when it is a predetermined time before the start time of the live distribution, the user PC 4 executes this notification program and displays the message "Live distribution will start soon" on the display section 14 to remind the content provider of the live distribution and moves on to the next step SP52.

At this time, if the live distribution mode is not set by the content provider, the CPU 10 of the user PC 4 automatically selects the live distribution mode according to the application program and displays the distribution mode screen 54 (FIGS. 10A and 10B) on the display section 14.

In step SP52, when it is the time for permitting the start of a connection with the streaming server 8 (5 minutes before the live distribution start time), the CPU 10 of the user PC 4 executes a predetermined connection processing program to automatically carry out communication/connection processing to establish a connection via a dedicated line or the Internet connection with the streaming server 8.

In step SP53, when it is the start time at which a connection is possible, the user PC 4 automatically starts communication/connection processing by the Internet connection, sends a reservation ID to the database server 155 through an Internet connection line preset by the content provider to send an authentication request for a communication/connection.

Thus, since the CPU 10 of the user PC 4 automatically carries out calling processing, the content provider needs not to perform operations such as entering telephone numbers. Especially in the case of a live distribution, when the user PC 4 is used in the mode as shown in FIGS. 4A and 4B, input operations of the keyboard 16A by the content provider become very bothered, and therefore by allowing the user PC 4 to automatically carry out the calling processing without operations such as entering telephone numbers, the present invention can provide a more comfortable content creation environment for the content provider.

In step SP54, the database server 155 carries out authentication processing by confirming whether the reservation ID received from the user PC 4 is registered in the reservation database 151 for the reservation time zone in which a live distribution starts immediately after this.

Here, when the reservation ID received from the user PC 4 is registered in the reservation database 151, the database server 155 decides that the user PC 4 who is the sender of this reservation ID is a content provider who owns a legitimate reservation, and when the reservation ID received from the user PC 4 is not registered in the reservation database 151 for the reservation time zone, the database server 155 decides that the user PC 4 who is the sender of this reservation ID is not a content provider who owns a legitimate reservation.

In this case, the database server 155 carries out authentication processing only using a reservation ID and this has the following effect. For example, when carrying out authentication of a live reservation using a user ID and password owned by a registered member of this personal casting service, if the user ID and password are legitimate ones, the database server 155 can confirm that the access is made by a legitimate registered member, but by only doing so cannot decide whether the registered member owns the live reservation for the reservation time zone or not.

In this case, after confirming that the user is the registered member, the database server 155 further needs to check the registered content of the live reservation and check whether the registered member identified by the user ID has made a reservation for the reservation time zone or not, which makes the authentication processing complicated.

On the other hand, using the above-described reservation ID only used for a live reservation for the authentication processing, the database server 155 need not to perform authentication processing on the user ID because this reservation ID is the information that only registered members can know, and this method has the effect that it is possible to decide whether an accessing user has made a legitimate reservation or not through simple authentication by only checking whether the reservation ID is registered as the live reservation for the reservation time zone which comes immediately after the access.

In step SP55, the database server 155 sends back the result of the authentication processing on the live reservation to the user PC 4 and moves on to the next step SP56.

In step SP56, since the authentication processing has completed without problems, the CPU 10 of the user PC 4 establishes a transmission path with the streaming server 8 and moves on to the next step SP57.

On the other hand, in step SP56 if the authentication result from the database server 155 shows that a user does not own a legitimate reservation, the CPU 10 of the user PC 4 does not make a connection with the streaming server 8.

In step SP57, when the CPU 10 of the user PC 4 has made the Internet connection with the streaming server 8, the CPU 10 of the user PC 4 also sends the reservation ID to the streaming server 8 and sends a request for a live distribution as in the case of sending the reservation ID to the database server 155, and moves on to the next step SP58.

In step SP58, upon reception of a live distribution request from the user PC 4, the streaming server 8 sends the received reservation ID to the database server 155 of the server use reservation control center 5 to authenticate whether the user PC 4 is owned by a content provider who owns a legitimate reservation and moves on to the next step SP59.

In step SP59, the database server 155 performs authentication processing by confirming whether the reservation ID received from streaming server 8 is registered in the reservation database 151 for the reservation time zone which comes immediately after this and moves on to the next step SP60.

This authentication processing is the same as the authentication processing when the reservation ID was received from the first user PC 4.

In step SP60, after performing the authentication processing on the reservation ID, the database server 155 sends back the authentication result to the streaming server 8 and moves on to the next step SP61.

In step SP61, when the authentication result from the database server 155 shows that a user owns a legitimate reservation, the streaming server 8 permits a live distribution by the user PC 4, sends the permission to the user PC 4, and acquires information on the live distribution (reservation time zone and distribution channel, etc.) from the reservation database 151 to control the live distribution based on the information.

In next step SP62, the CPU 10 of the user PC 4 starts a live distribution with applying preset effect processing in real time on the moving image data of content taken by the digital video camera 19 by the content provider operating the jog dial 16B and operation buttons 16C as appropriate, and thereby sends the content to the streaming server 8 over the Internet 2 in real time.

At this time, the streaming server 8 performs a multistream distribution to the client PCs 7A, 7B and 7C unconditionally if the number of clients PCs is within a channel quota to operate live distribution.

Then, when the live reservation end time comes, the CPU 10 of the user PC 4 completes the processing of sending content to the streaming server 8.

Once the streaming server 8 starts a live distribution in this way, the streaming server 8 sends time information of the service provider acquired from the NTP server 153 and audience number information indicating the number of the client PCs 7A, 7B and 7C receiving the live distribution, to the user PC 4.

In addition to the time information of the service provider and audience number information received from the streaming server 8, the CPU 10 of the user PC 4 displays various kinds of information such as distribution information indicating that a live distribution is in progress, elapsed time information, time information on the service provider side, time information on the user PC 4 side, reservation start time information, reservation end time information, live distribution remaining time information, image size information, and transmission rate information, on the status window 103 (FIGS. 10A and 10B) of the live distribution mode screen 54.

With reference to this status window 103, the content provider can know various kinds of information on the live distribution currently in progress. Especially the content provider can accurately grasp audience rating information of audience receiving the live distribution and use this as reference for channel selection (selection of quota) for carrying out the next live distribution.

Since the content transmission processing from the user PC 4 is completed when the live reservation end time comes, the streaming server 8 completes the processing of performing a stream distribution to the client PCs 7A, 7B and 7C and forcibly disconnects the communication with the user PC 4 when the server connection end time shown in "Available server connection time" of the reservation setting information file 184 (FIG. 22) comes.

Before the live reservation end time, if the content provider operates the jog dial 16B (FIGS. 3A and 3B and FIGS. 4A and 4B), etc. and selects/determines "Start/stop distribution" of the GUI 102 on the live distribution mode screen 54 with the focus F, the CPU 10 of the user PC 4 completes the processing of sending content, disconnects the communication with the streaming server 8 and can thereby forcibly stop a live distribution before the live reservation end time.

(2-4) Processing of Stream Distribution from Streaming Server to Client PC

Then, the streaming server 8 receives the content sent from the user PC 4 and performs content stream distribution processing to requesting client PCs 7A, 7B and 7C. This stream distribution processing will be explained with reference to the display screen, etc. of a client PC 7A, 7B or 7C.

To send a content distribution request, when a client user turns power ON, the client PC 7A, 7B or 7C starts browser software and after the client user enters a predetermined URL, the client PC 7A, 7B or 7C requests the live casting server 150 for browsing the personal casting service top page screen 160 over the Internet 2.

Thus, the client PC 7A, 7B or 7C displays the personal casting service top page screen 160 (FIG. 12) received from the live casting server 150 over the Internet 2 on the display screen.

This personal casting service top page screen 160 shows, by default, the program presentation display screen 160A corresponding to the case of clicking on the "Today's program" button 160B, which in turn shows program presentation information of content to be distributed today just like frames of a film which are moving cyclically.

Figure 30:
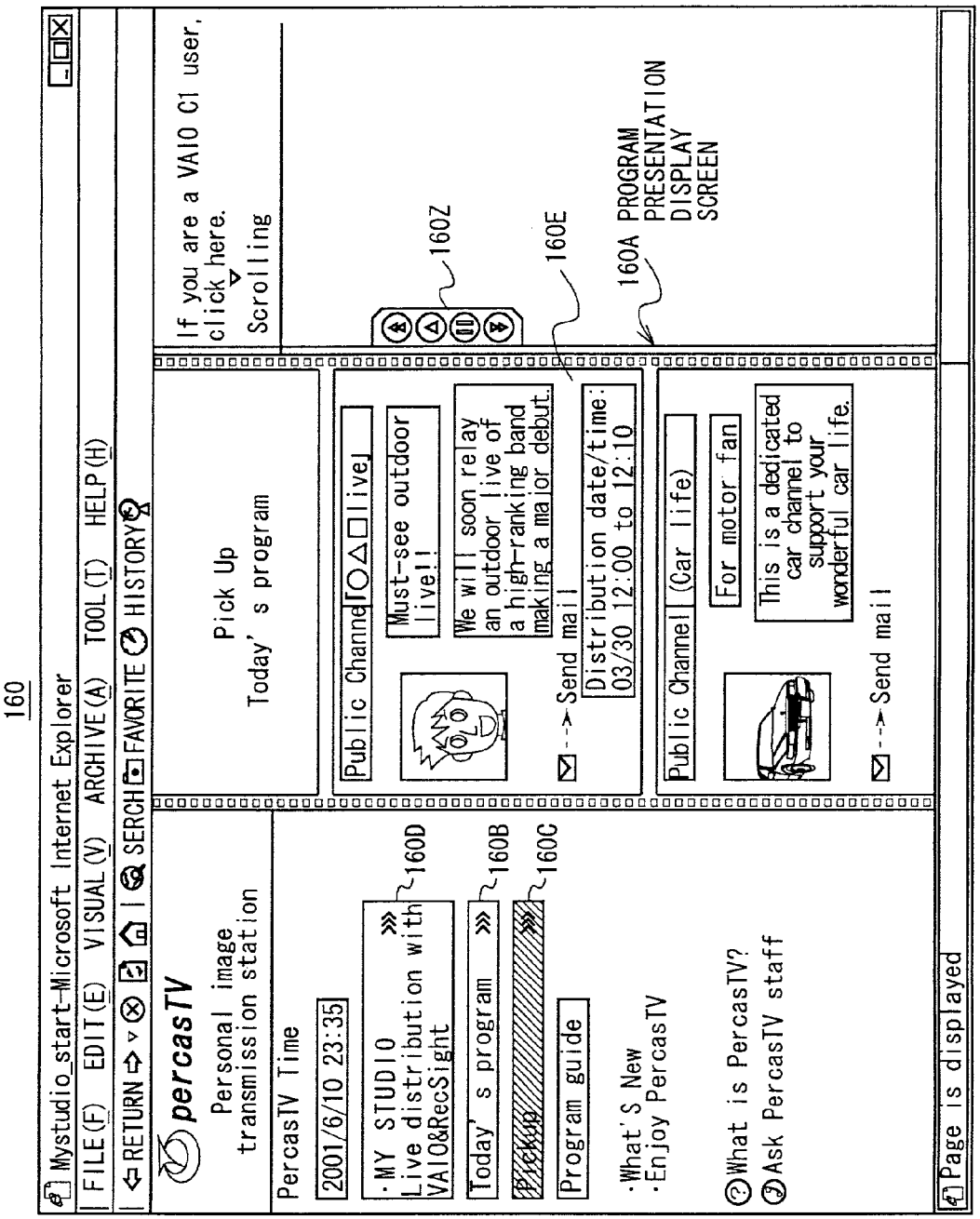
FIG. 30 is a schematic diagram showing a personal casting service top page screen corresponding to a "Pickup" button.

On the personal casting service top page screen 160, when the client user clicks on the "Pickup" button 160C, the CPU 10 of the user PC 4 displays the program presentation information of content from one month before the scheduled date for the distribution until one day before the distribution on the program presentation display screen 160A as shown in FIG. 30.

Figure 31:
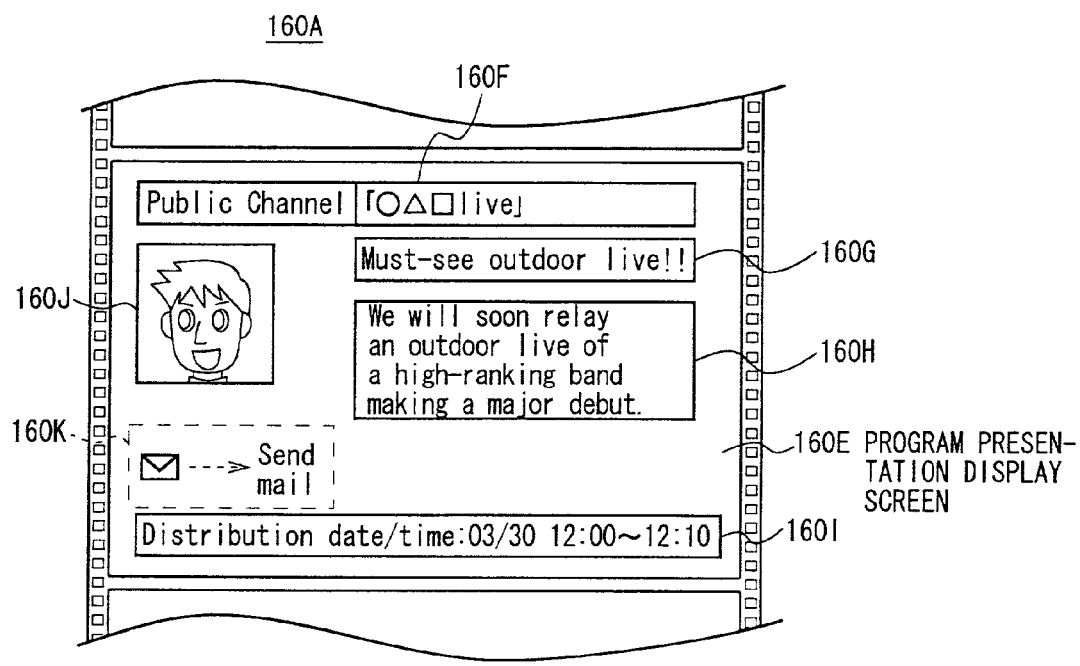
FIG. 31 is a schematic diagram showing a program presentation display screen.

As shown in FIG. 31, on the program presentation display screen 160A, individual content program presentation information appears in the program presentation information display section 160E, and as individual program presentation information, the program title display section 160F shows a program title, the sub-title display section 160G shows a sub-title corresponding to the program title, the program summary display section 160H shows a summary of the program, the broadcasting date/time display section 160I shows a scheduled date/time of distribution, the portrait display section 160J shows a portrait of the content provider and the mail icon display section 160K shows an icon to send e-mail.

The program title displayed in the program title display section 160F of the program presentation information display section 160E is the program name entered in the title input field 171B of the program presentation page editing screen 171 (FIG. 26 and FIG. 27), the sub-title displayed in the sub-title display section 160G is the sub-title entered in the sub-title input field 171C of the program presentation page editing screen 171, and the program summary displayed in the program summary display section 160H is the contents entered in the program summary input field 171E.

Furthermore, the broadcasting date/time displayed in the broadcasting date/time display section 160I is the contents entered in the reservation contents display field 171A, the portrait displayed in the portrait display section 160J is the portrait corresponding to the portrait number set in the portrait number setting field 171H, and the icon for sending e-mail displayed in the mail icon display section 160K is displayed depending on the setting of the message acceptance setting field 171K.

Thus, the live casting server 150 can present the content including the content summary, as the program presentation information on the program presentation display screen 160A of the personal casting service top page screen 160 (FIG. 12).

Furthermore, by posting the program presentation display screen 160A on the personal casting service top page screen 160, the live casting server 150 can widely notify all client users who use the personal casting service of the program, thereby necessarily increasing the chances for the client users to select and watch the program.

Since the client user can know in advance the existence of the program through the program presentation display screen 160A of the personal casting service top page screen 160, the client user can click on the "Today's program" button 160B and click on the program presentation information display section 160E of the program presentation display screen 160A on the distribution date.

Thus, the live casting server 150 sends a Web page of a detailed information display screen on the program to requesting client PCs 7A, 7B and 7C.

The client PC 7A, 7B or 7C displays a program detailed information screen 173 as shown in FIG. 32 based on the Web page, allows the client user to confirm the detailed information of the program, and when the client user enters a password to obtain a permission to receive the stream distribution of the program and clicks on the "Replay" button 175, the client PC 7A, 7B or 7C sends the password to the streaming server 8.

In the case where the client PC 7A, 7B or 7C does not store real-time replay software to reproduce and display the content received from the streaming server 8, the user can click on the "Replay software" button 176 before clicking on the "Replay" button 175 to download the replay software beforehand.

The streaming server 8 sends the password received from the client PC 7A, 7B or 7C to the database server 155 of the server use reservation control center 5.

The database server 155 authenticates whether the password received from the streaming server 8 is legitimate or not with reference to the reservation database 151 and sends back the authentication result to the streaming server 8.

When the streaming server 8 decides based on the authentication result received from the database server 155 that the password is the legitimate one, the streaming server 8 decides whether or not to carry out a live distribution to the client PC 7A, 7B or 7C based on the preset quota for the channel of the live distribution.

The streaming server 8 actually compares the number of client PCs currently receiving out a live distribution and the quota set for the channel and when the quota is already reached, the streaming server 8 will not perform the live distribution for any other client PCs.

On the other hand, if the number of client PCs is smaller than the quota set for the channel when a client PC 7A, 7B or 7C sends a distribution request, the streaming server 8 carries out a live distribution, permits the client PC 7A, 7B or 7C to receive the live distribution and carries out stream distribution processing.

Figure 33:
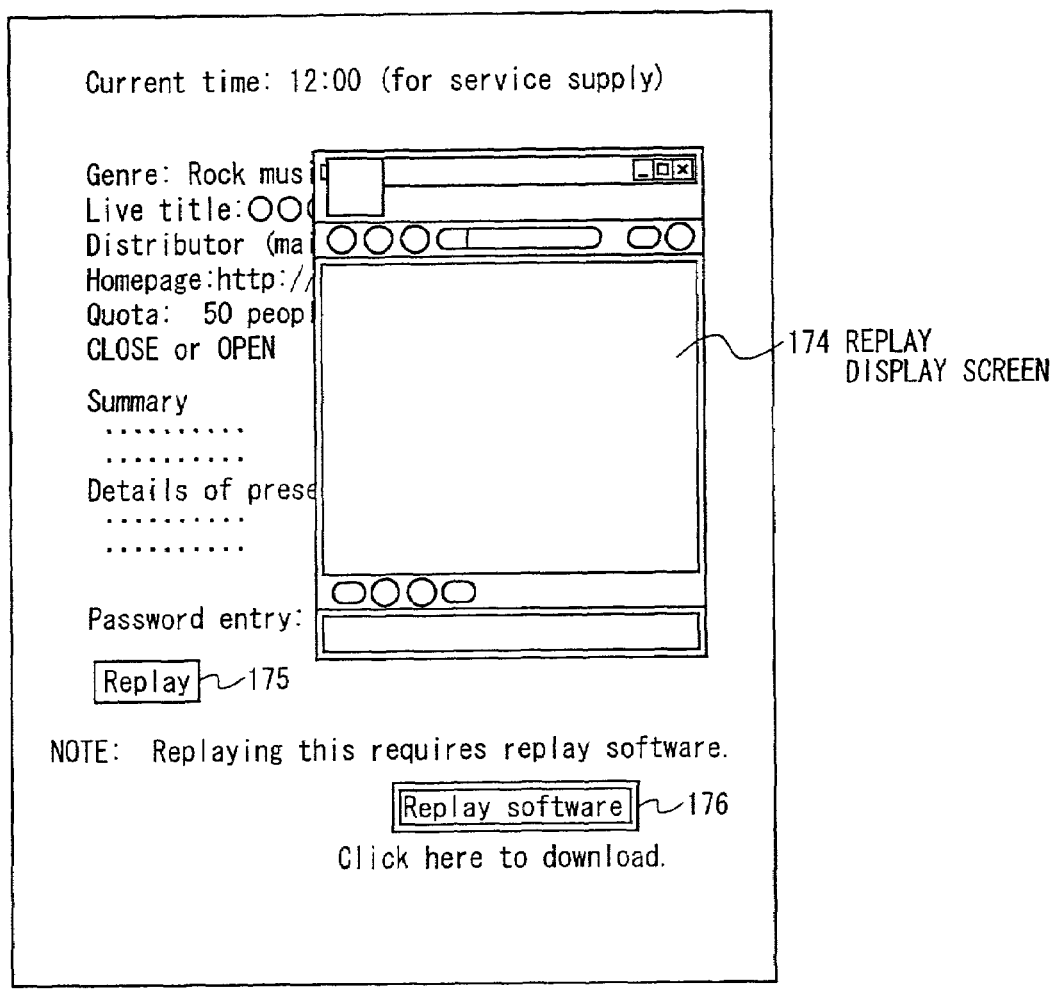
FIG. 33 is a schematic diagram showing a replay display screen.

Thus, the client PC 7A, 7B or 7C displays the content stream-distributed from the streaming server 8 on a replay display screen 174 as shown in FIG. 33 in real time and thereby allows the client user to view the live-distributed content in real time.

In this case, a replay button 175 that appears on the detailed information screen 173 is displayed on the replay display screen 174 at timing corresponding to the delay time set in the display time delay setting field 171J of the program presentation page editing screen 171.

(3) Operation and Effects

According to the above-described configuration, when the content provider checks the "Yes" checkbox in the program notification setting field 164C of the new program reservation screen 164 (FIG. 18) and clicks on the "Set" button 164D, the CPU 10 of the user PC 4 makes a setting so that the program presentation information is posted on the program presentation display screen 160A of the personal casting service top page screen 160.

Furthermore, when the broadcasting date/time is set on the next broadcasting date/time setting screen 165 (FIG. 19), the reservation contents are confirmed on the next payment screen 166 (FIG. 20), credit card information is entered and then a click is made on the "Set" button 166D, the CPU 10 of the user PC 4 creates a desired reservation information file based on various kinds of information set on the new program reservation screen 164 (FIG. 18), broadcasting date/time setting screen 165 (FIG. 19) and the payment screen 166 (FIG. 20) and sends the desired reservation information file to the live casting server 150 over the Internet 2 to make a reservation/registration.

At this time, the live casting server 150 of the server use reservation control center 5 makes a reservation/registration and at the same time carries out billing processing by rewriting the billing flag information of the reservation database 151 as "Enabled", and can thereby automatically collect charges for program notification carried out through the program presentation display screen 160A without forcing the content provider of the user PC 4 to perform complicated operations.

Furthermore, the live casting server 150 sends the personal casting service top page screen 160 including the content program presentation information to the client PCs 7A, 7B and 7C and guides the client users of the client PCs 7A, 7B and 7C to directly know the program presentation information through the program presentation display screen 160A of the personal casting service top page screen 160 and naturally select content.

Therefore, the content provider can find the value deserving the payment for program notification carried out through the program presentation display screen 160A and distribute content to much more client users with the user PC 4.

Furthermore, this content distribution system 1 responds to inquiries via e-mails, through the program presentation display screen 160A of the personal casting service top page screen 160, and can thereby not only distribute content but also raise expectations of having a sub-effect of gathering more customers to events, etc. related to the content, achieving higher advertising effects.

According to the above-described configuration, by only checking the "Yes" checkbox in the program notification selection field 164C of the new program reservation screen 164 with the user PC 4, the content distribution system 1 can automatically make a setting so that the content program presentation information is displayed on the program presentation display screen 160A of the personal casting service top page screen 160, perform reservation/registration and billing processing simultaneously using the live casting server 150 and thereby notify the content provider of the program without forcing the content provider to perform complicated operations and automatically collect charges for program notification.

(4) Other Embodiments

The above-described embodiment has described the case where the program presentation information of content is displayed on the program presentation display screen 160A of the personal casting service top page screen 160, but the present invention is not limited to this and a still image or moving image expressing one scene of the content can also be displayed instead of the presentation information. In this case, it is possible to visually appeal to the client users, attract their attentions to the program and further increase the chances of selecting this program.

Furthermore, the above-described embodiment has described the case where content are distributed in real time, but the present invention is not limited to this and it is also possible to store content received from the user PC 4 as the user terminal in a storage medium such as a hard disk and distribute it on demand as an on-demand system.

Furthermore, the above-described embodiment has described the case where a program to execute a live reservation, a program to restrict various selection operations by the user PC 4 by automatically creating a reservation setting information file 184 and sending it to the user PC 4, and various programs to make the hard disk 13 of the user PC 4 execute various kinds of live reservation and various kinds of processing to realize a live distribution are preinstalled in the hard disk of the live casting server 150 as the content distribution server and content distribution control apparatus. However, the present invention is not limited to this and it is also possible to install various application programs by playing back a program storage medium made up of a package medium such as a Compact Disc Read Only Memory (CD-ROM) and Digital Versatile Disc Read Only Memory (DVD-ROM) storing these various application programs or install various application programs by replaying a program storage medium such as a semiconductor memory or magneto-optical disk storing application programs temporarily or permanently.

As the means for storing various application programs in these program storage media, it is possible to use cable and radio communication media such as a local area network and digital satellite broadcasting, and to store them through various communication interfaces such as a router and modem.

Furthermore, the above-described embodiment has described the case where the Internet 2 is used as a network to make a live reservation between the user PC 4 and live casting server 150, but the present invention is not limited to this, and it is also possible to use various networks constructed of cable or wireless communication.

Furthermore, the above-described embodiment has described the case where the user PC 4 with the built-in video camera 19 is used as a terminal on the broadcaster side carrying out a live distribution. However, it is also possible to use a digital video camera connected to a normal PC using a cable via an Institute of Electrical and Electronics Engineers (IEEE) 1394 interface, etc. or a PC with a wirelessly connected digital video camera. It is also possible to use a cellular phone connected to a digital video camera using a cable or a cellular phone with a built-in digital video camera instead of the user PC 4.

A case where a cellular phone with a built-in digital video camera is used instead of the user PC 4 will be explained below more specifically.

Figure 34:
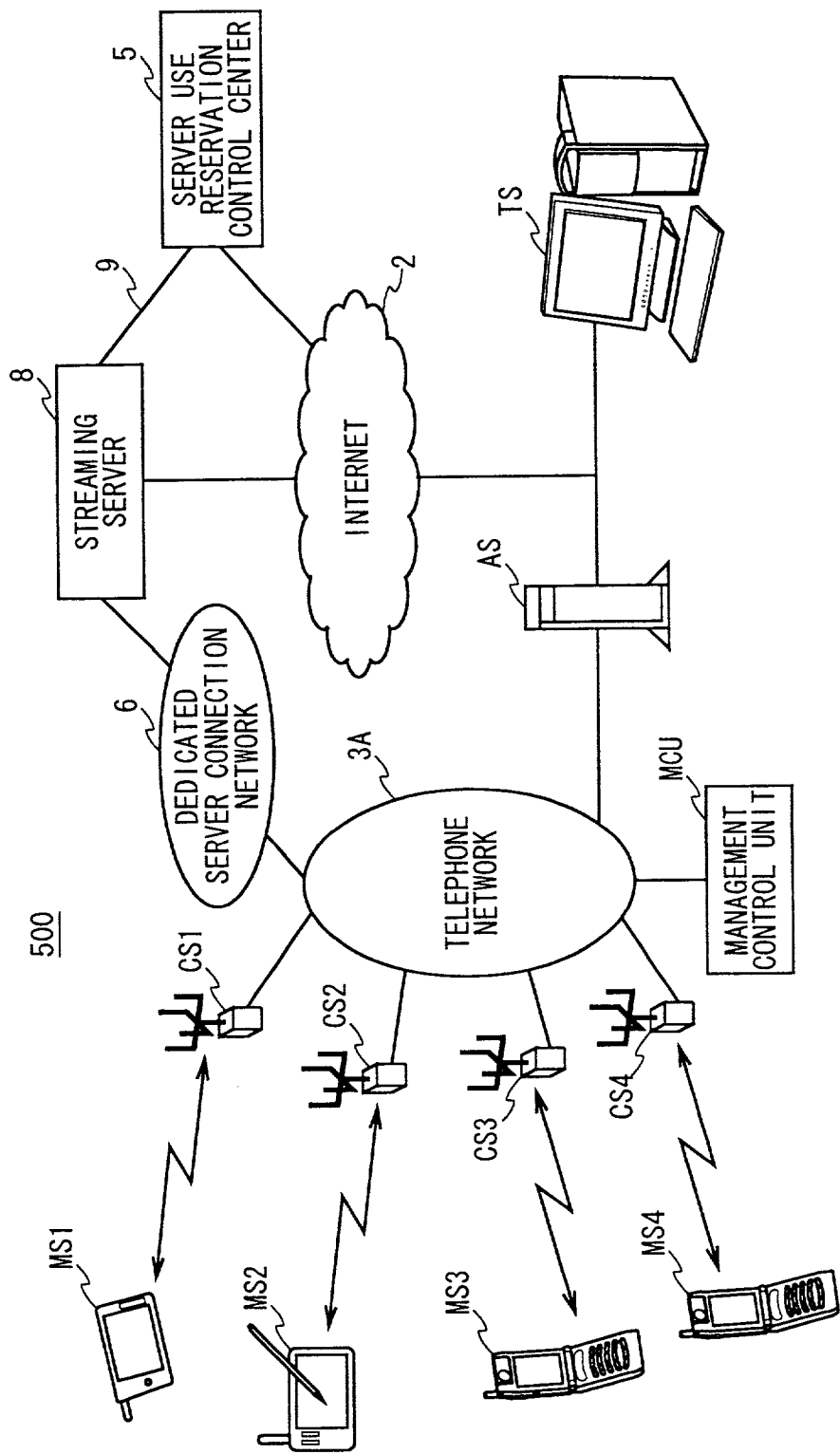
FIG. 34 is a schematic diagram showing a configuration of a content distribution system according to another embodiment.

As shown in FIG. 34, reference numeral 500 denotes an overall content distribution system including a cellular phone MS3 to which the present invention is applied, the communication service supply area is divided into cells in desired sizes and base stations CS1 to CS4, which are fixed radio stations, are located in these respective cells.

To these base stations CS1 to CS4, mobile radio stations such as portable information terminals MS1 and MS2, digital cellular phones with a camera MS3 and MS4 are connected by radio under, for example, a code division multiple access scheme called Wideband Code Division Multiple Access (W-CDMA), and using a frequency band of 2 GHz is capable of realizing high-volume and high-speed data communications at a data transfer rate of a maximum of 2 Mbps.

Thus, the portable information terminals MS1 and MS2, digital cellular phones with a camera MS3 and MS4 are designed to be able to communicate high-volume data at a high speed under the W-CDMA system, and can thereby realize not only voice communications but also a variety of data communications such as the transmission/reception of e-mails, browsing of simple homepages and transmission/reception of images.

Furthermore, the base stations CS1 to CS4 are connected to a telephone network 3A with a cable line, the telephone network 3A is further connected to the Internet 2, many subscriber cable terminals (not shown), computer networks and local area networks, etc.

The telephone network 3A is also connected to an access server AS of an Internet service provider and the access server AS is connected to a content server TS owned by the Internet service provider.

This content server TS is designed to provide contents such as simple homepages in a compact Hyper Text Markup Language (HTML) format file or the like, in response to requests from the portable information terminals MS1 and MS2, digital cellular phones with a camera MS3 and MS4.

This compact HTML is a subset of HTML in which only tags that can be reflected in a display apparatus of a limited size are kept and all the rest are removed. In the case of iMode (registered trademark), which is a service of NTT DoCoMo, Inc., an iMode HTML is used, which focuses on only functions necessary for cellular phones, uses approximately 30 types of tags and has such limitations that it is not possible to specify character attributes or colors of text and use of a GIF file with two-stage adjustment is recommended for images.

Using such a compact HTML and descriptive languages, Handheld Device Markup Language (HDML) and Wireless Markup language (WML), etc. used for a mobile communications protocol Wireless Application Protocol (WAP) makes it possible to create files for simple homepages to be browsed using cellular phones, etc. which have limited display area and display capacity.

As in the case of this embodiment, in this content distribution system 500, a server use reservation control center 5 and streaming server 8 are connected to the Internet 2, so that the subscriber cable terminals, portable information terminals MS1 and MS2, digital cellular phones with a camera MS3 and MS4 are allowed to get access to the server use reservation control center 5 and streaming server 8.

When performing a stream distribution via the streaming server 8 in the content distribution system 500, the digital cellular phones with a camera MS3 and MS4 send content to the streaming server 8 via the dedicated server connection network 6, but can also send content over the Internet 2.

By the way, the portable information terminals MS1 and MS2, digital cellular phones with a camera MS3 and MS4 communicate with the base stations CS1 to CS4 using a 2 Mbps simple transport protocol and the base stations CS1 to CS4 communicate with the streaming server 8 over the Internet 2 using a TCP/IP protocol.

A management control unit MCU is connected to subscriber cable terminals, the portable information terminals MS1 and MS2 and digital cellular phones with a camera MS3 and MS4 with the telephone network 3A and performs authentication processing and billing processing, etc. for the portable information terminals MS1 and MS2, digital cellular phones with a camera MS3 and MS4.

Figure 35:
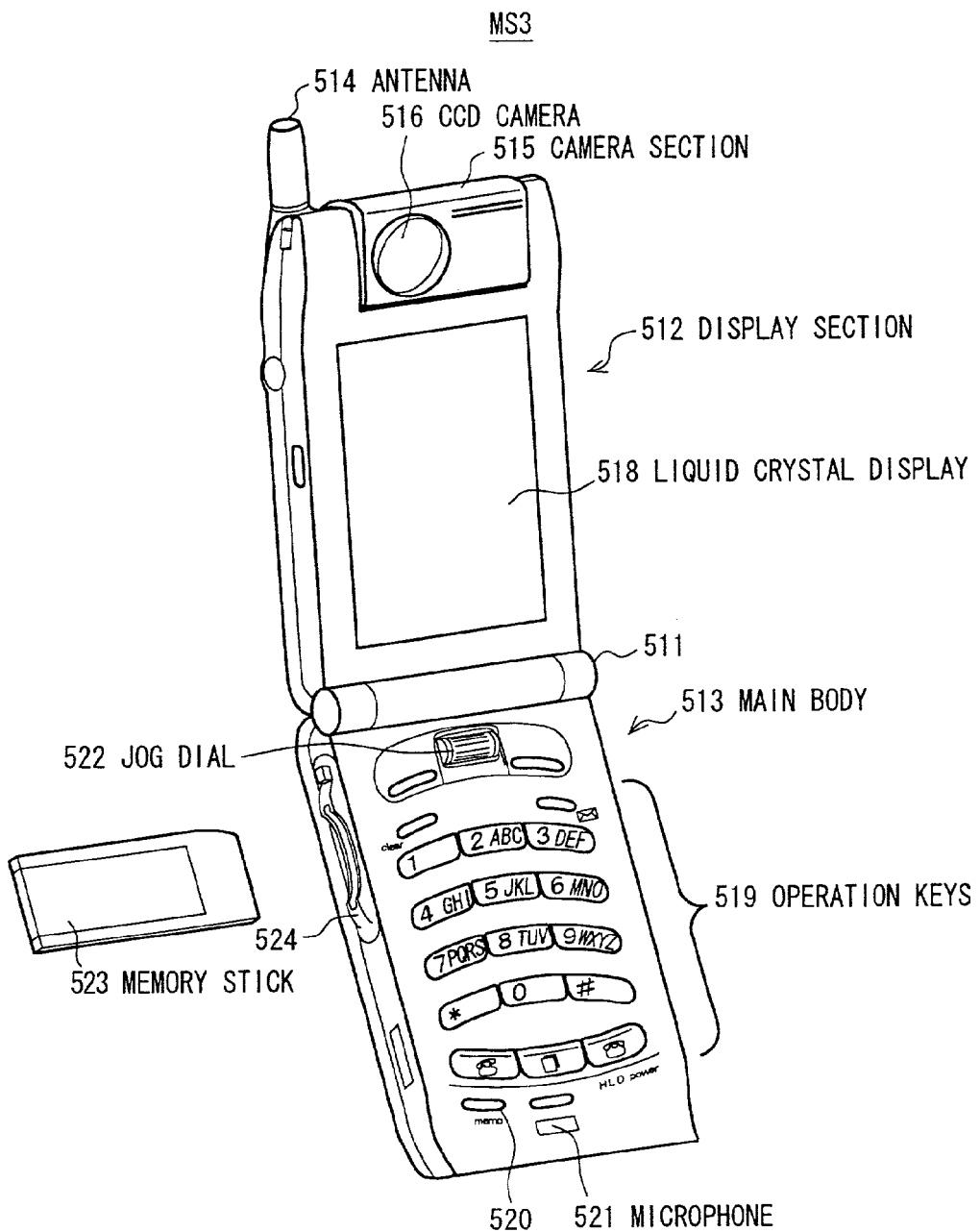
FIG. 35 is a schematic perspective view showing an external configuration of a digital cellular phone with a camera.

Now, an external configuration example of the digital cellular phone with a camera MS3 instead of the user PC 4 (FIG. 1) will be explained. As shown in FIG. 35, the digital cellular phone with a camera MS3 is divided into a display section 512 and main body 513 with a central hinge section 511 as a border and is made foldable at the hinge section 511.

At the top left of the display section 512, a telescopic antenna 514 for transmission/reception is provided so that radio waves are sent/received to/from the base station CS3 via this antenna 514.

In the top center of the display section 512, a camera section 515 is provided in such a way as to be rotated within approximately 180° and it is possible to take pictures of a desired object using a CCD camera 516 of this camera section 515.

Figure 36:
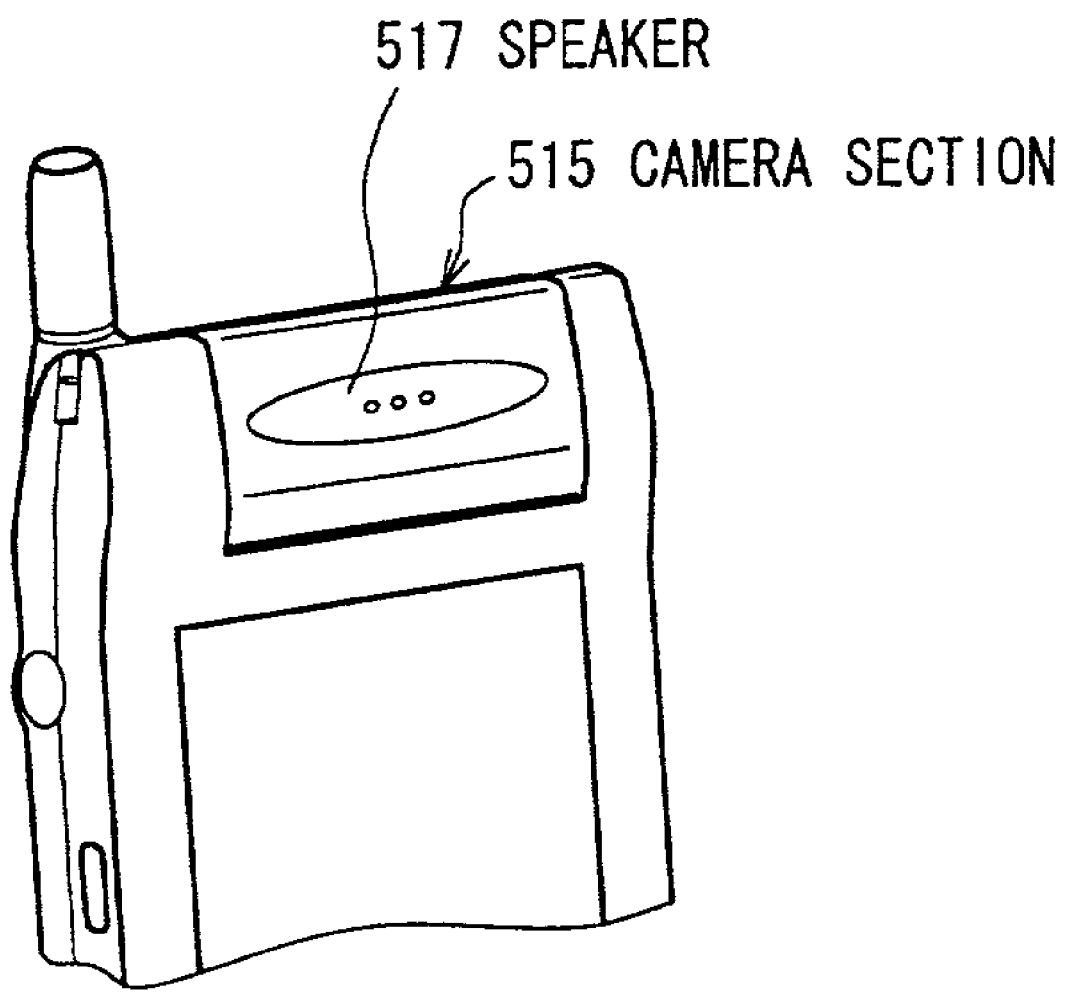
FIG. 36 is a schematic perspective view showing a display section of the digital cellular phone with a camera with the camera section rotated.

When the content provider turns the camera section 515 almost 180° and fixes it in that position, a speaker 517 provided in the center of the back of the camera section 515 faces the front, as shown in FIG. 36, which switches the mode of the phone to a normal voice communicable state.

The display section 512 is further provided with a liquid crystal display 518 on the front, which displays a radio wave receiving state, the amount of battery remaining, names and telephone numbers registered in the directory, call records, the contents of e-mails, simple homepages, images taken by the CCD camera 516 of the camera section 515 and television program picture received via a built-in antenna (not shown).

On the other hand, the main body 513 is provided with operation keys 519 on the surface including numeric keys "0" to "9", call key, redial key, call termination/power key, clear key and e-mail key and it is possible to enter various instructions using the operation keys 519.

The main body 513 is further provided with a memo button 520 and a microphone 521 below the operation keys 519 and the memo button 520 allows voice during a conversation to be recorded and the microphone 521 allows voice of the user during a conversation to be collected.

The main body 513 is further provided with a jog dial 522 above the operation keys 519, which allows free rotation and pressing operations, slightly protruding from the surface of the main body 513, and it is possible to perform various operations such as scrolling the telephone directory list and e-mail shown on the liquid crystal display 518, gripping a simple homepage and feeding images, according to the rotation operation of the jog dial 522.

For example, when the content provider selects a desired telephone number from a plurality of telephone numbers in a directory list, which appears on the liquid crystal display, by rotating the jog dial 522, and presses the jog dial 522 in an inward direction, the main body 513 confirms the selected telephone number and automatically proceeds with call processing for the telephone number.

The main body 513 is provided with a battery pack (not shown) on the back and when the call termination/the power key is turned on, the battery pack supplies power to the respective circuits making them ready to operate.

Furthermore, the main body 513 is provided with a memory stick slot 524 to allow a freely detachable memory stick (trademark of Sony Corporation) 523 to be inserted therein in the upper section on the left side of the main body 513 and when the memo button 520 is depressed, it is possible to record voice of the person on the other end of communication, record video data of a television program being received or record e-mail, simple homepage or image taken by the CCD camera 516 in the memory stick 523.

Here, the memory stick 523 is a kind of flash memory developed by Sony Corporation, applicant of the present invention. This memory stick 523 is a flash memory element, which is a kind of electrically rewritable or erasable nonvolatile memory Electrically Erasable and Programmable Read Only Memory (EEPROM) housed in a small, thin plastic case of H21.5×W50×D0.8 mm, which allows various types of data such as image, voice and music to be recorded or read via a 10-pin terminal.

Furthermore, the memory stick 523 adopts an original serial protocol capable of securing compatibility between different devices used even if specifications of built-in flash memories change to increase its capacity, etc., realizes high-speed performance of a maximum recording speed of 1.5 MB/S and maximum reading speed of 2.45 MB/S and is provided with a safety switch thus securing high reliability.

Thus, the digital cellular phone with a camera MS3 is constructed in such a way as to make it possible to insert the memory stick 523 and thereby share data with other electronic devices via the memory stick 523.

Figure 37:
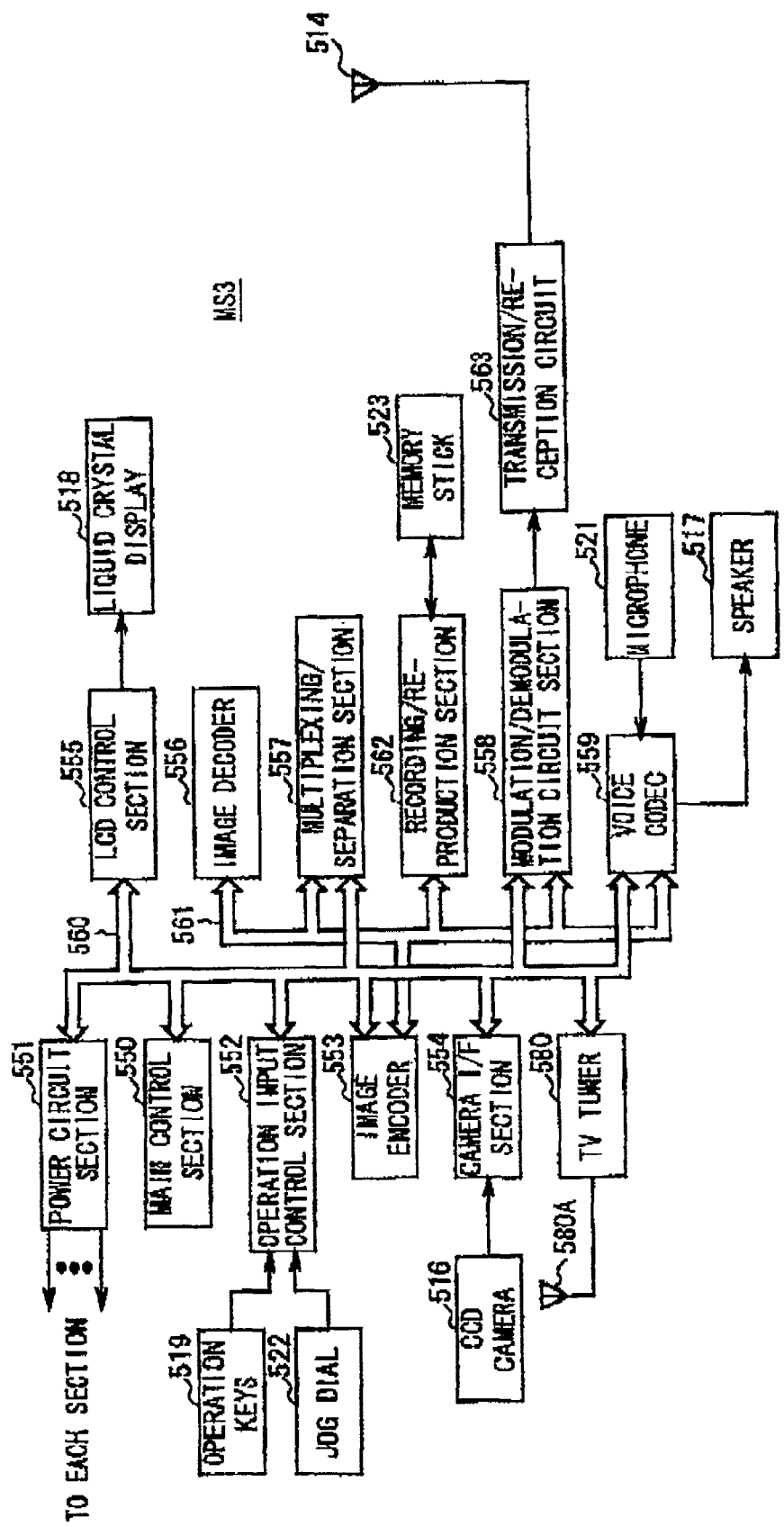
FIG. 37 is a block diagram showing a circuit configuration of the digital cellular phone with a camera.

As shown in FIG. 37, the digital cellular phone with a camera MS3 has a configuration with a main control section 550 that performs centralized control over the display section 512 and main body 513, connected to a power circuit section 551, an operation input control section 552, an image encoder 553, a camera interface section 554, a liquid crystal display (LCD) control section 555, an image decoder 556, a multiplexing/separation section 557, a recording/reproduction section 562, a modulation/demodulation circuit section 558 and an audio CODEC 559 with a main bus 560, and the image encoder 553, image decoder 556, multiplexing/separation section 557, modulation/demodulation circuit section 558 and audio CODEC 559 are connected with one another with a synchronization bus 561.

When the content provider turns on the call termination/power key, the power circuit section 551 supplies power from the battery pack to the respective sections and thereby makes the digital cellular phone with a camera MS3 ready to operate.

Under the control of the main control section 550 made up of a CPU, ROM and RAM, etc., in a voice conversation mode, the digital cellular phone with a camera MS3 converts an audio signal collected by the microphone 521 to digital audio data at the audio CODEC 559, applies spread spectrum processing at the modulation/demodulation circuit section 558, applies digital/analog conversion processing and frequency conversion processing at the transmission/reception circuit section 563 and then transmits the signal from the antenna 514.

Furthermore, in the voice conversation mode, the digital cellular phone with a camera MS3 amplifies a received signal received from the antenna 514, applies frequency conversion processing and analog/digital conversion processing, applies despread spectrum processing at the modulation/demodulation circuit section 558, converts to an analog audio signal at the audio CODEC 559 and outputs the audio signal from the speaker 517.

Furthermore, when sending e-mail in a data communication mode, the digital cellular phone with a camera MS3 sends text data of the e-mail entered through operations of the operation keys 519 and jog dial 522 to the main control section 550 via the operation input control section 552.

The main control section 550 applies spread spectrum processing to the text data at the modulation/demodulation circuit section 558, digital/analog conversion processing and frequency conversion processing at the transmission/reception circuit section 563 and then transmits the resultant to the base station CS3 (FIG. 59) via the antenna 514.

On the other hand, when receiving e-mail in the data communication mode, the digital cellular phone with a camera MS3 applies despread spectrum processing to a received signal received from the base station CS3 through the antenna 514 at the modulation/demodulation circuit section 558, restores the original text data, then displays the text data as e-mail on the liquid crystal display 518 via the LCD control section 555.

After this, the digital cellular phone with a camera MS3 can also record the received e-mail in the memory stick 523 through the recording/reproduction section 562 according to the operation by the content provider.

On the other hand, when sending image data in the data communication mode, the digital cellular phone with a camera MS3 supplies image data taken by the CCD camera 516 to the image encoder 553 via the camera interface section 554.

By the way, when the image data is not sent, the digital cellular phone with a camera MS3 can also directly display the image data taken by the CCD camera 516 on the liquid crystal display 518 via the camera interface section 554 and the LCD control section 555.

The image encoder 553 converts the image data supplied from the CCD camera 516 to coded image data by applying compression and coding under a predetermined coding scheme, for example, Moving Picture Experts Group (MPEG)2 and MPEG4 and sends this to the multiplexing/separation section 557.

At this time, the digital cellular phone with a camera MS3 sends voice collected using the microphone 521 during picture taking by the CCD camera 516 to the multiplexing/separation section 557 via the audio CODEC 559 as digital audio data.

The multiplexing/separation section 557 multiplexes the coded image data supplied from the image encoder 553 and the audio data supplied from the audio CODEC 559 according to a predetermined system, applies spread spectrum processing to the resulting multiplexed data at the modulation/demodulation circuit section 558, applies digital/analog conversion processing and frequency conversion processing at the transmission/reception circuit section 562 and then transmits the signal from the antenna 514.

On the other hand, when receiving the data of a moving image file linked to a simple homepage, etc. in the data communication mode, the digital cellular phone with a camera MS3 applies despread spectrum processing to a received signal received from the base station CS3 via the antenna 514 at the modulation/demodulation circuit section 558 and sends the resulting multiplexed data to the multiplexing/separation section 557.

The multiplexing/separation section 557 separates the multiplexed data into coded image data and audio data, supplies the coded image data to the image decoder 556 through the synchronization bus 561 and supplies the audio data to the audio CODEC 559.

The image decoder 556 decodes the coded image data according to a decoding scheme corresponding to a predetermined coding scheme such as MPEG2 or MPEG4, thereby generates reproduced moving image data, supplies this to the liquid crystal display 518 via the LCD control section 555 and, thus, displays, for example, the moving image data included in the moving image file linked to the simple homepage.

At this time, the audio CODEC 559 converts the audio data to an analog audio signal, supplies this to the speaker 517 and thereby reproduces, for example, the audio data included in the moving image file linked to the simple homepage.

As in the case of e-mails, the digital cellular phone with a camera MS3 can also record the data linked to the received simple homepage, etc. in the memory stick 523 via the recording/reproduction section 562 according to the user operation.

In addition to the above-described configuration, the digital cellular phone with a camera MS3 stores various application programs similar to the above-described embodiment in the ROM of the main control section 550, gets access to the live casting server 150 (FIG. 15) of the server use reservation control center 5 and can thereby perform the above-described member registration, live reservation/registration processing, etc. with the live casting server 150 according to these application programs.

Thus, the digital cellular phone with a camera MS3 can also execute the reservation/registration processing sequence as shown in FIG. 15 to make a setting to post the program presentation information of content on the program presentation display screen 160A of the personal casting service top page screen 160 via the live casting server 150.

The above-described embodiment has described the case where personal content is distributed as personal broadcasting from the user PC 4 via the streaming server 8, but the present invention is not limited to this and can also distribute content as general commercial Internet broadcasting, etc.

The above-described embodiment has described the case of constructing the server use reservation control center 5 and steaming server 8 as the content distribution control apparatus by: the live casting server 150 and reservation database 151 as a reservation accepting means for accepting from a user terminal a reservation for a distribution channel to be used to distribute content to the client PCs 7A, 7B and 7C via the streaming server 8 serving as a content distribution server; the live casting server 150 and user database 152 as a billing processing means for performing billing processing for a request which is made from the user terminal to post program presentation information on content to be distributed on the distribution channel as prescribed information, on the personal casting service top page screen 160 as a site for personal broadcasting; the live casting server 150 as a top page creating means for posting the program presentation information on content on the personal casting service top page screen 160; and the streaming server 8 as a transmitting means for transmitting the personal casting service top page screen 160 including the program presentation information to the client PCs 7A, 7B and 7C. The present invention, however, is not limited to this, and a content distribution control apparatus can be constructed by integrating the server use reservation control center 5 and streaming server 8.

As described above, the present invention allows a client user to see the top page on which content information is posted first, and thereby naturally increases the chances of selecting content, which can realize a content distribution system, content distribution control apparatus, content distribution control method, content distribution control program and content distribution control program storage medium, capable of distributing content to much more client users.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A content distribution system comprising a user terminal and a content distribution server for distributing content received from said user terminal to clients over a network, said content distribution system wherein:
   said user terminal reserves a distribution channel on which said content selected by said clients are distributed to said clients via said content distribution server and requests said content server to post predetermined information provided by said user terminal and related to said content to be distributed on said distribution channel on a top page of a site of said content distribution system, said predetermined information including a future date and time of distribution of said content, a user of said user terminal providing both the content and the predetermined information, the user providing the predetermined information when reserving the distribution channel; and
   said content distribution server posts the predetermined information on said content to be distributed on said top page of said site, and provides said top page containing predetermined information on said content to said clients, before distributing said content to said client a fee charging unit configured to charge the user of the user terminal a first fee for the predetermined service of posting the content on the web page and a second fee for the additional service of posting the presentation information on the web page.

2. The content distribution system according to claim 1, wherein
   said content distribution server posts the title of said content and images on said content as said predetermined information.

3. A content distribution control apparatus for distributing content received from a user terminal to clients over a network, comprising:
   reservation accepting means for accepting a reservation from said user terminal for a distribution channel on which said content selected by said clients are distributed to said clients via said content distribution server, said reservation including predetermined information provided by said user terminal and related to said content on a top page and a future date and time of distribution of said content, a user of said user terminal also providing the content to be distributed;
   top page creating means for creating a webpage including the predetermined information provided by said user terminal and related to said content on a top page and the future date and time of distribution of said content; and
   transmitting means for providing said top page on which said predetermined information is posted to said clients before distributing said content to said client fee charging means for charging the user of the user terminal a first fee for the predetermined service of posting the content on the web page and a second fee for the additional service of posting the presentation information on the web page.

4. The content distribution control apparatus according to claim 3, wherein
   said top page creating means creates the webpage including the title of said content and images on said content as said predetermined information.

5. A content distribution control method for distributing content received from a user terminal to clients over a network, comprising:

accepting a reservation from said user terminal for a distribution channel on which said content selected by said clients are distributed to said clients, said reservation including predetermined information provided by said user terminal and related to said content on a top page and a future date and time of distribution of said content, a user of said user terminal also providing the content to be distributed;

creating a webpage including the predetermined information provided by said user terminal and related to said content on a top page and the future date and time of distribution of said content; and providing said top page on which said predetermined information is posted to said clients before distributing said content to said client charging the user of the user terminal a first fee for the predetermined service of posting the content on the web page and a second fee for the additional service of posting the presentation information on the web page.

6. The content distribution control method according to claim 5, wherein said creating includes creating the webpage including the title of said content and images on said content as said predetermined information.

7. A memory configured to hold computer readable instructions that when executed by a processor to execute a content distribution control method comprising:

accepting a reservation from a user terminal for a distribution channel on which content received from said user terminal and selected by clients are distributed to said clients over a network, said reservation including predetermined information provided by said user terminal and related to said content on a top page and a future date and time of distribution of said content, a user of said user terminal also providing the content to be distributed;

creating a webpage including the predetermined information provided by said user terminal and related to said content on a top page and the future date and time of distribution of said content; and providing said top page on which said predetermined information is posted to said clients before distributing said content to said client charging the user of the user terminal a first fee for the predetermined service of posting the content on the web page and a second fee for the additional service of posting the presentation information on the web page.

8. The memory according to claim 7, wherein said creating includes creating a webpage including the title of said content and images on said content as said predetermined information.

9. A content distribution control apparatus for distributing content received from a user terminal to clients over a network, comprising:

a reservation accepting unit configured to accept a reservation from said user terminal for a distribution channel on which said content selected by said clients are distributed to said clients via said content distribution server, said reservation including predetermined information provided by said user terminal and related to said content on a top page and a future date and time of distribution of said content, a user of said user terminal also providing the content to be distributed;

a top page creating unit configured to create a webpage including the predetermined information provided by said user terminal and related to said content on a top page and the future date and time of distribution of said content; and a providing unit configured to provide said top page on which said predetermined information is posted to said clients before distributing said content to said client a fee charging unit configured to charge the user of the user terminal a first fee for the predetermined service of posting the content on the web page and a second fee for the additional service of posting the presentation information on the web page.

10. The content distribution control apparatus according to claim 3, further comprising:

billing processing means for performing, when requested by said user terminal to post predetermined information on said content to be distributed on said distribution channel on the top page of a predetermined site, billing processing in response to said request.

11. The content distribution control apparatus according to claim 9, further comprising:

billing processing unit configured to perform, when requested by said user terminal to post predetermined information on said content to be distributed on said distribution channel on the top page of a predetermined site, billing processing in response to said request.

12. The content distribution system according to claim 1, wherein said predetermined information includes an Internet webpage of a user providing the content.

13. The content distribution system according to claim 1, wherein said user terminal reserves the future date and time for content distribution when reserving said distribution channel.

14. The content distribution system according to claim 1, wherein said user terminal pays a fee when reserving said distribution channel.

15. The content distribution system according to claim 14, wherein said user terminal reserves the future date and time for content distribution when reserving said distribution channel, and said fee is based on said future date and time.

16. The content distribution system according to claim 1, wherein said user terminal provides a password required for viewing the content.

17. The content distribution system according to claim 1, wherein the content is live content.

18. The content distribution system according to claim 1, wherein said user terminal provides to the content distribution server a user ID and password for a user of the user terminal to login to the content distribution server before reserving said distribution channel.

19. The content distribution system according to claim 1, wherein said predetermined information includes an image designated by a user.

20. The content distribution system according to claim 1, wherein the user of the user terminal provides the content to be distributed at the time of distribution such that the content is a live performance.

* * * * *